(12) United States Patent
Li et al.

(10) Patent No.: US 10,733,139 B2
(45) Date of Patent: *Aug. 4, 2020

(54) PRIVATE MEMORY ACCESS FOR A RECONFIGURABLE PARALLEL PROCESSOR USING A PLURALITY OF CHAINED MEMORY PORTS

(71) Applicant: AzurEngine Technologies Zhuhai Inc., Zhuhai (CN)

(72) Inventors: Yuan Li, San Diego, CA (US); Jianbin Zhu, San Diego, CA (US)

(73) Assignee: AzurEngine Technologies Zhuhai Inc., Zhuhai, Guangdong Province (CN)

( * ) Notice: Subject to any disclaimer, the term of this patent is extended or adjusted under 35 U.S.C. 154(b) by 153 days.

This patent is subject to a terminal disclaimer.

(21) Appl. No.: 15/919,727

(22) Filed: Mar. 13, 2018

(65) Prior Publication Data
US 2018/0267931 A1 Sep. 20, 2018

Related U.S. Application Data

(60) Provisional application No. 62/472,579, filed on Mar. 17, 2017, provisional application No. 62/471,367, (Continued)

(51) Int. Cl.
*G06F 15/80* (2006.01)
*G06F 9/30* (2018.01)
(Continued)

(52) U.S. Cl.
CPC ........ *G06F 15/8023* (2013.01); *G06F 9/3001* (2013.01); *G06F 9/3004* (2013.01);
(Continued)

(58) Field of Classification Search
CPC .......... G06F 15/7867–7892; G06F 15/80–803; G06F 15/8061–8069; G06F 15/8046; G06F 15/8092

See application file for complete search history.

(56) References Cited

U.S. PATENT DOCUMENTS 5,581,778 A * 12/1996 Chin ..................... G06F 9/3885
712/16
5,889,947 A 3/1999 Starke
(Continued)

OTHER PUBLICATIONS

Bjorn De Sutter, Praveen Raghavan, Andy Lambrechts, "Coarse-Grained Reconfigurable Array Architectures", Handbook of Signal Processing Systems 2010 Edition by Bhattacharyya, S.S., et al. pp. 449-484.
(Continued)

*Primary Examiner* — Keith E Vicary
(74) *Attorney, Agent, or Firm* — IPro, PLLC

(57) ABSTRACT

Processors, systems and methods are provided for thread level parallel processing. A processor may comprise a plurality of processing elements (PEs) and a plurality of memory ports (MPs) for the plurality of PEs to access a memory unit. Each PE may have a plurality of arithmetic logic units (ALUs) that are configured to execute a same instruction in parallel threads. Each of the plurality of MPs may comprise an address calculation unit configured to generate respective memory addresses for each thread to access a different memory bank in the memory unit.

20 Claims, 24 Drawing Sheets

Related U.S. Application Data filed on Mar. 15, 2017, provisional application No. 62/471,372, filed on Mar. 15, 2017, provisional application No. 62/471,368, filed on Mar. 15, 2017, provisional application No. 62/471,340, filed on Mar. 14, 2017.

(51) Int. Cl.

| | | |
|---|---|---|
| *G06F 9/445* | (2018.01) | |
| *G06F 15/78* | (2006.01) | |
| *G06F 12/0815* | (2016.01) | |
| *G06F 9/34* | (2018.01) | |
| *G06F 9/38* | (2018.01) | |
| *G06F 13/16* | (2006.01) | |

(52) U.S. Cl.
CPC ........ *G06F 9/3009* (2013.01); *G06F 9/30098* (2013.01); *G06F 9/34* (2013.01); *G06F 9/3808* (2013.01); *G06F 9/3867* (2013.01); *G06F 9/3885* (2013.01); *G06F 9/44505* (2013.01); *G06F 12/0815* (2013.01); *G06F 13/1673* (2013.01); *G06F 15/7821* (2013.01); *G06F 15/7867* (2013.01); *G06F 15/7871* (2013.01); *G06F 15/7875* (2013.01); *G06F 15/7878* (2013.01); *G06F 15/7885* (2013.01); *G06F 15/7889* (2013.01); *G06F 15/8046* (2013.01); *G06F 15/8061* (2013.01); *G06F 15/8069* (2013.01); *G06F 15/8092* (2013.01); *G06F 2212/1021* (2013.01); *Y02D 10/14* (2018.01)

(56) References Cited

U.S. PATENT DOCUMENTS

| | | | | |
|---|---|---|---|---|
| 5,900,011 A * | 5/1999 | Saulsbury | ........... | G06F 12/0897 711/119 |
| 5,960,211 A * | 9/1999 | Schwartz | ................ | G06F 15/80 712/15 |
| 6,347,346 B1 | 2/2002 | Taylor | | |
| 7,159,099 B2 * | 1/2007 | Lucas | ................. | G06F 9/30036 712/15 |
| 7,412,586 B1 * | 8/2008 | Rajopadhye | ........ | G06F 15/8015 712/10 |
| 7,506,134 B1 * | 3/2009 | Juffa | ..................... | G06F 9/5038 712/16 |
| 7,596,679 B2 * | 9/2009 | Abbo | ................. | G06F 15/8015 712/22 |
| 8,046,564 B2 * | 10/2011 | Yang | ....................... | G06F 7/483 712/15 |
| 8,155,113 B1 * | 4/2012 | Agarwal | ............. | G06F 15/7867 370/386 |
| 8,281,108 B2 * | 10/2012 | Vorbach | .............. | G06F 15/7867 712/15 |
| 8,516,222 B1 | 8/2013 | Agarwal et al. | | |
| 8,860,457 B2 * | 10/2014 | Rao | ......................... | G06F 15/80 326/39 |
| 9,535,705 B1 * | 1/2017 | Hazanchuk | ......... | G06F 15/7867 |
| 2003/0056091 A1 | 3/2003 | Greenberg | | |
| 2003/0056202 A1 | 3/2003 | May et al. | | |
| 2003/0102889 A1 * | 6/2003 | Master | ................ | G06F 15/7867 326/41 |
| 2004/0015899 A1 | 1/2004 | May et al. | | |
| 2004/0019765 A1 * | 1/2004 | Klein, Jr. | ............ | G06F 9/30181 712/15 |
| 2005/0216700 A1 | 9/2005 | Honary et al. | | |
| 2005/0283768 A1 * | 12/2005 | Ozone | ................. | G06F 15/7867 717/144 |
| 2006/0090062 A1 | 4/2006 | Vorbach et al. | | |
| 2006/0218376 A1 * | 9/2006 | Pechanek | .............. | G06F 9/3001 712/11 |
| 2007/0101107 A1 | 5/2007 | Isobe | | |
| 2007/0139074 A1 | 6/2007 | Reblewski | | |
| 2007/0143577 A1 | 6/2007 | Smith et al. | | |
| 2007/0220236 A1 | 9/2007 | Kasama | | |
| 2008/0140980 A1 * | 6/2008 | Mei | ...................... | G06F 13/1642 711/170 |
| 2008/0189514 A1 | 8/2008 | McConnell | | |
| 2009/0070552 A1 * | 3/2009 | Kanstein | ............. | G06F 15/7867 712/29 |
| 2009/0083530 A1 | 3/2009 | Nishijima et al. | | |
| 2009/0319762 A1 * | 12/2009 | Hanai | ................. | G06F 9/30072 712/233 |
| 2011/0078692 A1 * | 3/2011 | Nickolls | ............... | G06F 9/3004 718/103 |
| 2011/0099555 A1 * | 4/2011 | Kwon | ................. | G06F 15/7875 718/108 |
| 2011/0225415 A1 | 9/2011 | Yamada et al. | | |
| 2013/0268715 A1 * | 10/2013 | Fetterman | ............. | G06F 9/3887 711/5 |
| 2014/0244968 A1 * | 8/2014 | Greyzck | ................. | G06F 15/76 712/3 |
| 2015/0268963 A1 * | 9/2015 | Etsion | ..................... | G06F 9/448 712/225 |
| 2015/0378733 A1 | 12/2015 | Beylin et al. | | |
| 2016/0202991 A1 | 7/2016 | Eisen et al. | | |
| 2016/0259668 A1 * | 9/2016 | Glauert | ..................... | G06T 1/20 |
| 2016/0349832 A1 | 12/2016 | Jiao | | |
| 2017/0262407 A1 * | 9/2017 | Wang | .................. | G06F 15/7871 |
| 2017/0317679 A1 | 11/2017 | Suh et al. | | |
| 2018/0210730 A1 * | 7/2018 | Sankaralingam | ... | G06F 13/1689 |

OTHER PUBLICATIONS

Sankaralingam, K., Nagarajan, R., Liu, H., Kim, C., Huh, J., Burger, D., Keckler, S.W., Moore, C.R., "Exploiting ILP, TLP, and DLP with the polymorphous TRIPS architecture". SIGARCH Comput. Archit. News 31(2), 422-433 (2003)

Kim, Y., Mahapatra, R., Park, I., Choi, K.: Low power reconfiguration technique for coarse-grained reconfigurable architecture. IEEE Transactions on Very Large Scale Integration (VLSI) Systems 17(5), 593-603 (May 2009).

S. Yin, X. Yao, D. Liu, L. Liu and S. Wei, "Memory-Aware Loop Mapping on Coarse-Grained Reconfigurable Architecture," in IEEE Transactions on Very Large Scale Integration (VLSI) Systems, vol. 24, No. 5, pp. 1895-1908, May 2016, First Published: Sep. 2015 (Year: 2016).

Hartenstein, R., Herz, M. Hoffman, T., Nageldinger, U., "Generation of design suggestions for coarse-grain reconfigurable architectures". In: FPL '00: Proceedings of the 10th International Workshop on Field Programmable Logic and Applications, FPL '2000, Villach, Austria, Aug. 27-30, 2000.

PACT XPP Technologies: XPP-III Processor Overview White Paper, pp. 1-11, Jul. 13, 2006.

* cited by examiner

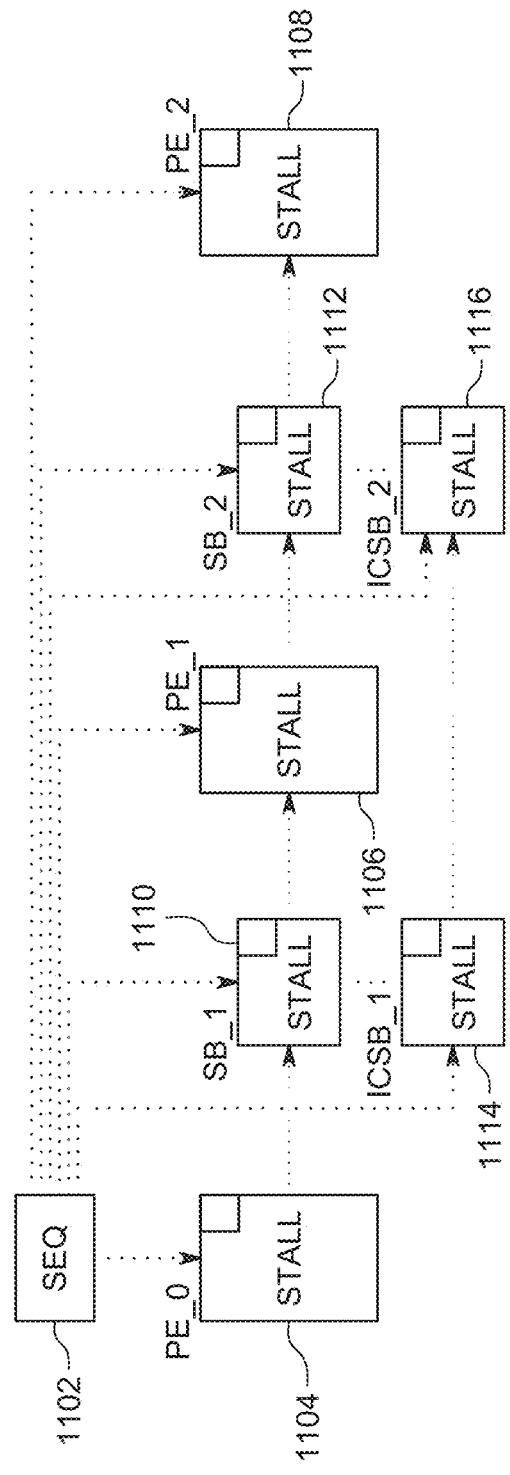
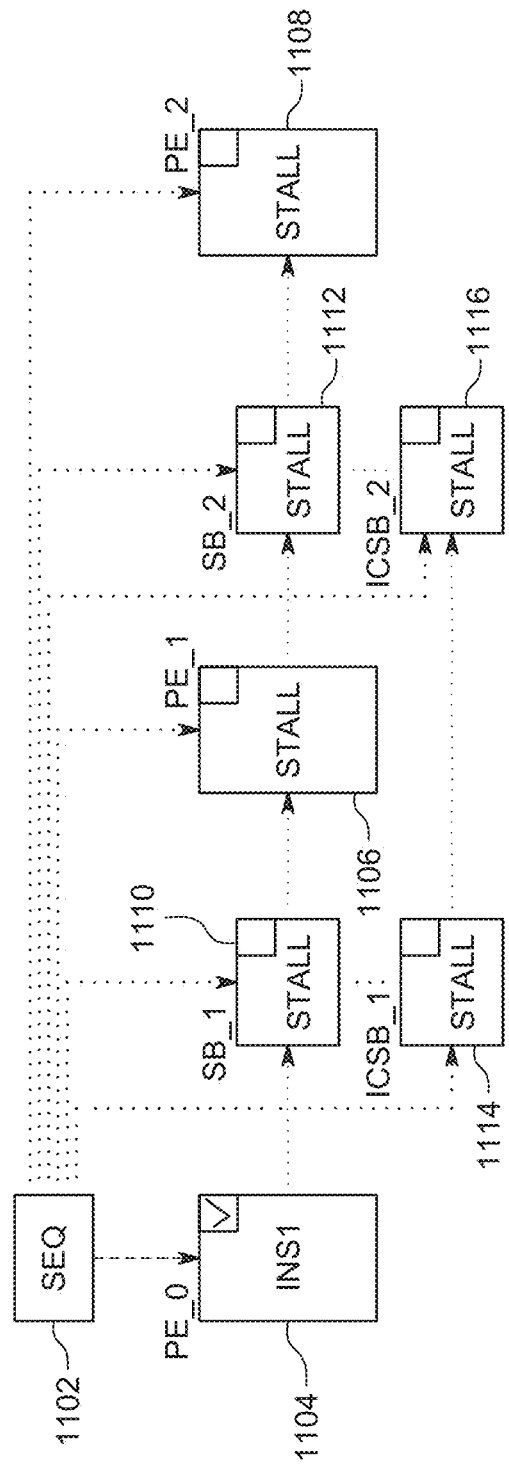
FIG. 11A
FIG. 11B

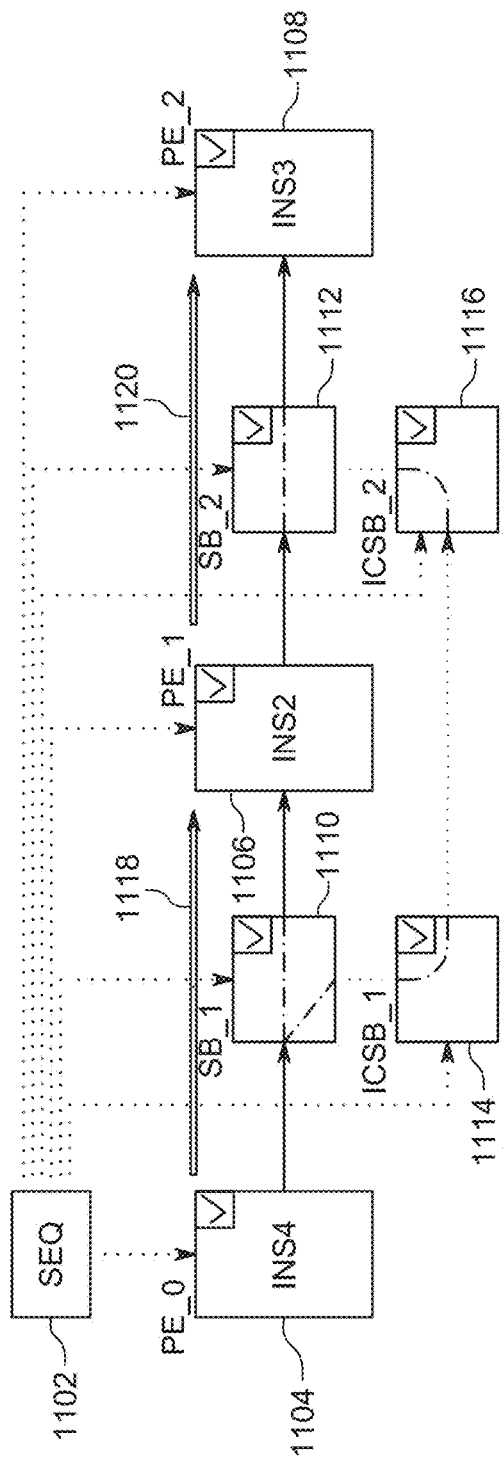
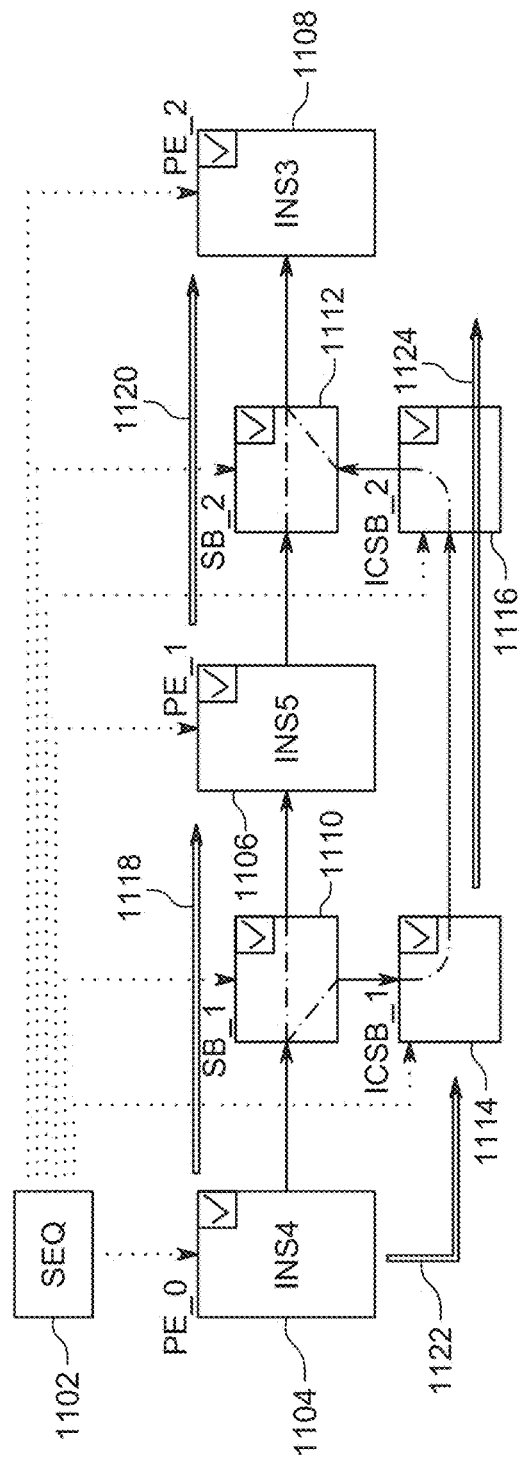
FIG. 11G
FIG. 11H

FIG. 12A

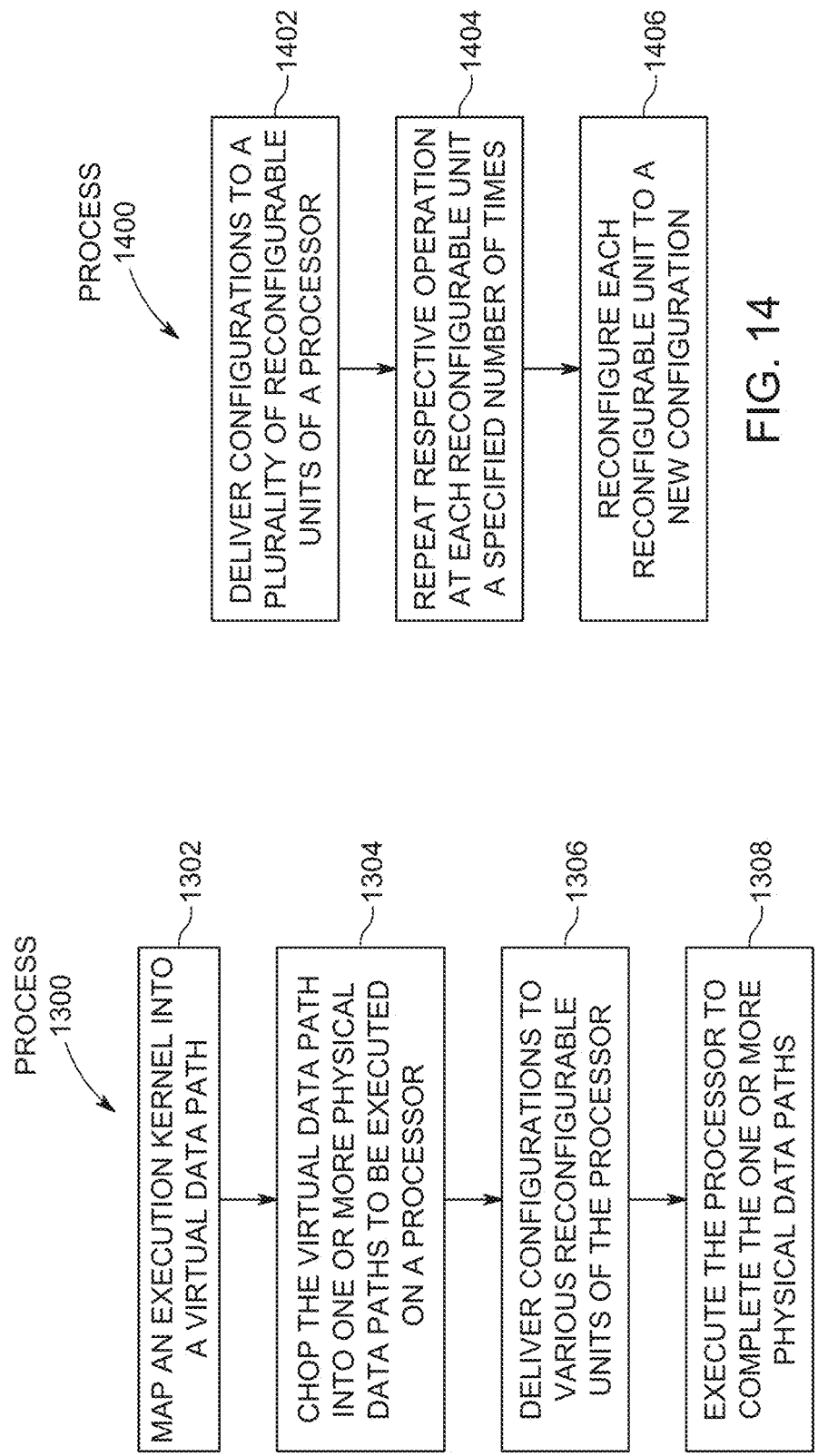

PRIVATE MEMORY ACCESS FOR A RECONFIGURABLE PARALLEL PROCESSOR USING A PLURALITY OF CHAINED MEMORY PORTS

RELATED APPLICATION FIELD

The application claims priority to U.S. Provisional Application 62/471,340, filed Mar. 14, 2017, entitled "Reconfigurable Parallel Processing," U.S. Provisional Application 62/471,367, filed Mar. 15, 2017, entitled "Circular Reconfiguration for Reconfigurable Parallel Processor," U.S. Provisional Application 62/471,368, filed Mar. 15, 2017, entitled "Private Memory Structure for Reconfigurable Parallel Processor," U.S. Provisional Application 62/471,372, filed Mar. 15, 2017, entitled "Shared Memory Structure for Reconfigurable Parallel Processor," U.S. Provisional Application 62/472,579, filed Mar. 17, 2017, entitled "Static Shared Memory Access for Reconfigurable Parallel Processor," the contents of these applications are hereby incorporated by reference in their entities.

TECHNICAL FIELD

The disclosure herein relates to computer architectures, particularly relates to reconfigurable processors.

BACKGROUND

Reconfigurable computing architecture with large amount of processing array can meet demand of computation power while keeping the power and silicon area efficient. Unlike field-programmable gate array (FPGA), Coarse-Grained Reconfigurable Architecture (CGRA) utilizes larger processing elements like arithmetic logic units (ALU) as its building blocks. It provides features of reconfigurability using high level language to quickly program the processing element (PE) array. One typical design of CGRA is shown in FIG. 1. It consists of a PE array, a configuration memory, a memory unit as a frame buffer and interconnections between the PEs and PEs to the frame buffer.

In general, CGRA is an approach to explore loop level parallelism. It is not specifically targeted to handle thread level parallelism. With any data dependency from one iteration to the next, the parallelism is largely limited. Therefore, the 2D array size is intended to be limited to an 8×8 PE array in most of the designs.

Graphics processing unit (GPU) architecture has provided a way to execute parallel threads in a Same Instruction Multiple Thread (SIMT) fashion. It is especially suitable for massive parallel computing applications. In these applications, typically no dependency is assumed between threads. This type of parallelism is beyond loop level parallelism within a software task, which CGRA is designed for. The thread level parallelism can be easily scalable beyond single core execution to multicore execution. The thread parallelism provides optimization opportunities and makes the PE array more efficient and more capable and it is easily made larger than 8×8. GPU, however, is not reconfigurable. Therefore, there is a need in the art to develop a next generation processor that can harness the processing capability of both CGRA and GPU.

SUMMARY

The present disclosure describes apparatus, methods and systems for massive parallel data processing. A processor according to various embodiments of the present disclosure may be designed to take advantage of massive thread level parallelism similar to GPU using programable processor array similar to CGRA. In one embodiment, a processor may efficiently process threads which are identical to each other but with different data, similar to SIMT architecture. A software program's data dependency graph may be mapped to a virtual data path with infinite length. Then the virtual data path may be chopped into segments that can be fit into multiple physical data paths, each physical data path may have its configuration context. A sequencer may distribute configurations of each PE into its configuration FIFO and similarly to switch boxes. A gasket memory may be used to temporarily store outputs of one physical data path configuration and give it back to the processing elements for the next configuration. Memory ports may be used to calculate addresses for read and write. FIFOs may be used to allow each PE for independent operation. Data stored in a memory unit may be accessed through either private or shared memory access method. The same data can be accessed through different access methods in different part of the software program to reduce data movement between memories.

In an exemplary embodiment, there is provided a processor comprising a plurality of processing elements (PEs) and a plurality of memory ports (MPs) for the plurality of PEs to access a memory unit. Each PE may have a plurality of arithmetic logic units (ALUs) that are configured to execute a same instruction in parallel threads. Each of the plurality of MPs may comprise an address calculation unit configured to generate respective memory addresses for each thread to access a different memory bank in the memory unit.

In another exemplary embodiment, there is provided a method comprising: generating a plurality of memory addresses by an address calculation unit in a memory port of a plurality of memory ports. The plurality of memory ports may provide access to a memory unit for a plurality of processing elements (PEs) each having a plurality of arithmetic logic units (ALUs) that are configured to execute a same instruction in parallel threads. The method may further comprise accessing a plurality of memory banks in the memory unit using the plurality of memory addresses with each thread accessing a different memory bank in the memory unit.

In yet another exemplary embodiment, there is provided a method comprising: generating a plurality of memory addresses by an address calculation unit in a memory port. The memory port may provide access to a memory unit for a processing element (PE) having a plurality of arithmetic logic units (ALUs) configured to execute a same instruction in parallel threads. The method may further comprises accessing a plurality of memory banks in the memory unit using the plurality of memory addresses with each thread accessing a different memory bank in the memory unit.

BRIEF DESCRIPTION OF FIGURES

FIGS. 11A-11I schematically shows a configuration process for a processor in accordance with an embodiment of the present disclosure.

FIG. 12A schematically shows a pipeline operation for executing a stream of instructions using a processor in accordance with an embodiment of the present disclosure.

FIG. 13 is a flowchart of a method for executing an execution kernel in accordance with an embodiment of the present disclosure.

FIG. 14 is a flowchart of a method for reconfiguration in accordance with an embodiment of the present disclosure.

DETAILED DESCRIPTION

Figure 1:
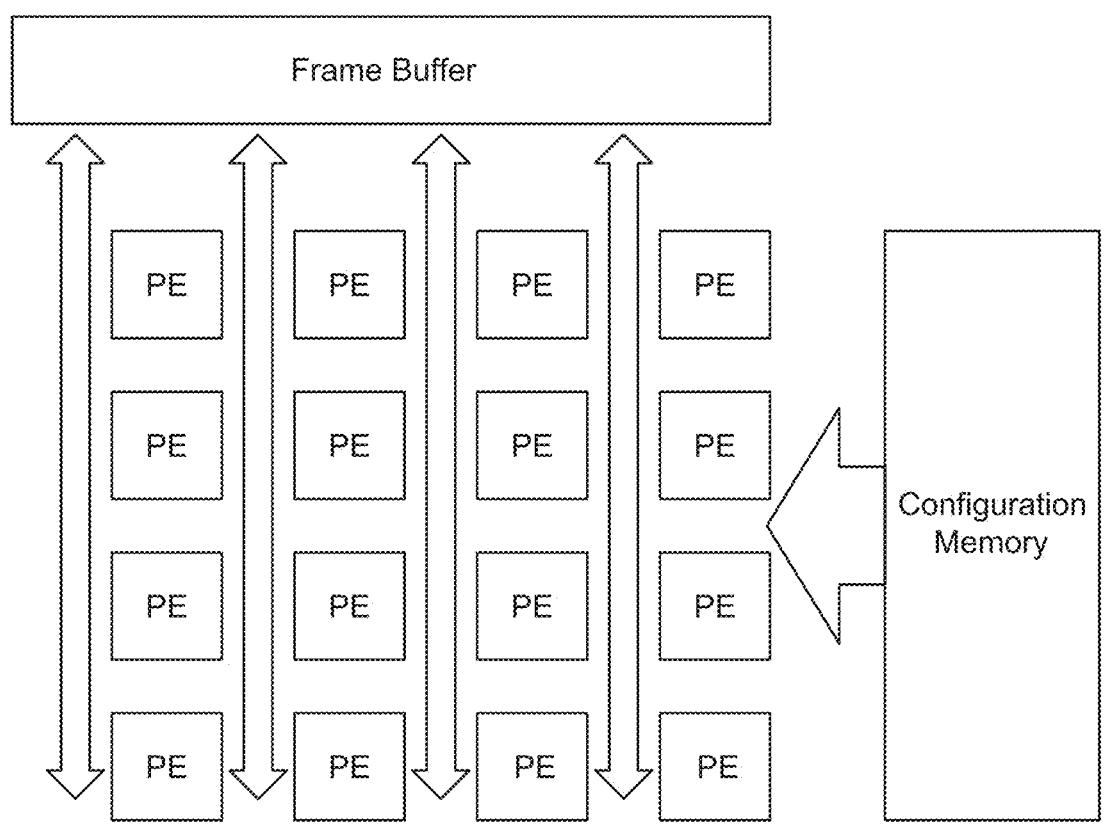
FIG. 1 schematically shows a prior art CGRA with a PE array.

Reference will now be made in detail to the embodiments of the present teaching, examples of which are illustrated in the accompanying drawings. Like elements in the various figures are denoted by like reference numerals for consistency. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

Figure 2:
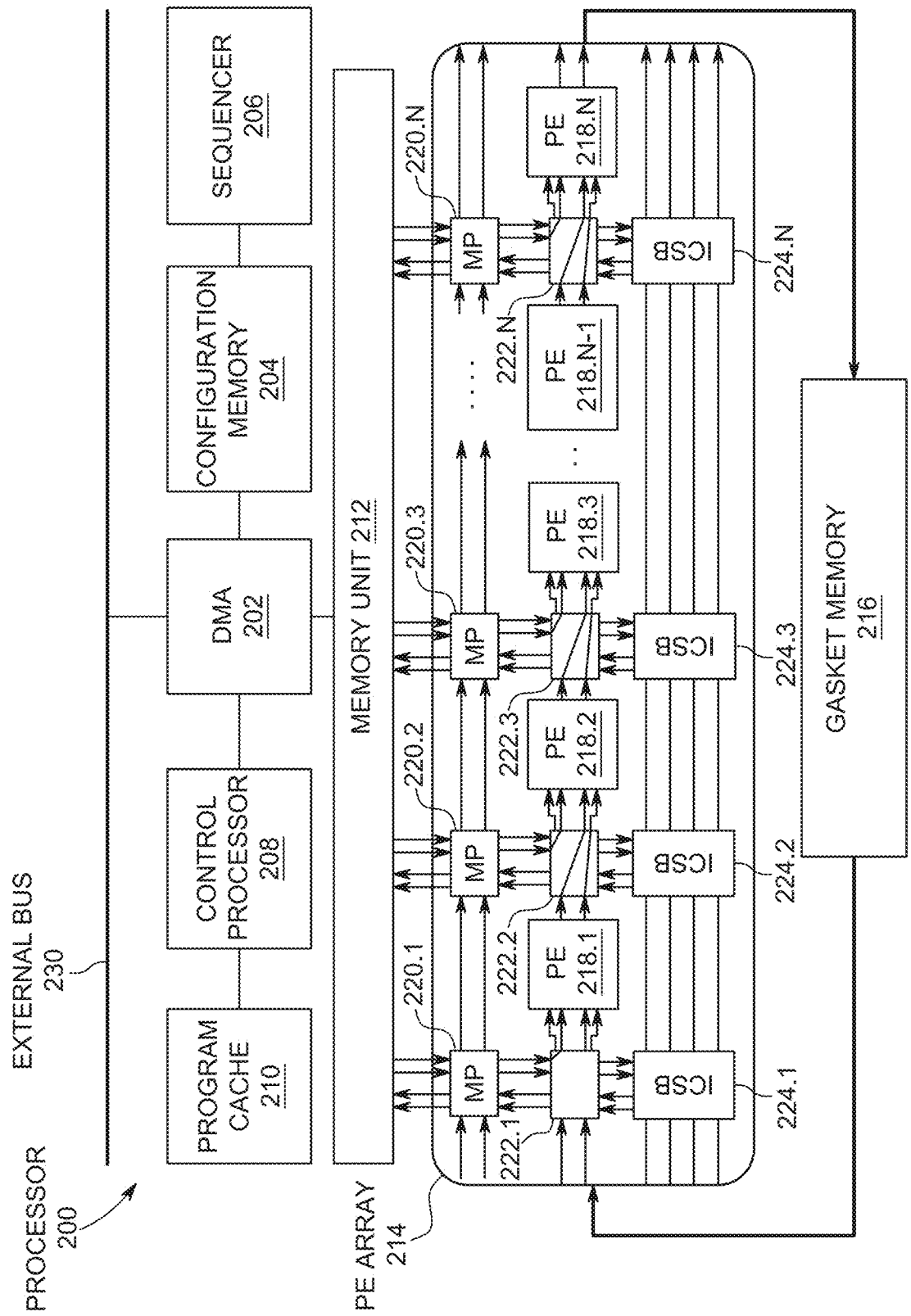
FIG. 2 schematically shows a processor in accordance with an embodiment of the present disclosure.

FIG. 2 schematically shows a processor 200 according to an embodiment of a processor. The processor 200 may comprise a direct memory access (DMA) module 202, a configuration memory 204, a sequencer 206, a control processor 208, a program cache 210, a memory unit 212, a PE array 214 and a gasket memory 216. The DMA module 202 may be coupled to an external bus 230 and may be controlled by the control processor 208. The DMA module 202 may be responsible to move executable instructions and non-executable data in and out from the external bus 230. The program cache 210 may store instructions and data to be used by the control processor 208 to control the operation of the DMA module 202. In one embodiment, the instructions and data stored in the program cache 210 may be used by the control processor 208 to handle sequencer programs.

It should be noted that as used herein, a "coupling" between two components, such as one component being "coupled" to another component may refer to an electronic connection between two components, which may include but not limited to, by electronic wiring, through an electronic element (e.g., a resistor, a transistor), etc. Moreover, in some embodiments, the processor 200 may be configured for massive thread level parallel processing. For example, one processing element (PE) in the PE array 214 may comprise multiple arithmetic logic units (ALUs) that may be configured to perform same operation but on different data (e.g., each in a separate thread). That is, in these embodiments with multiple ALUs, each PE may be configured to operate in a Single Instruction Multiple Threads (SIMT) fashion. In one embodiment, a PE with a vector address and a vector data input may generate vector data output. In some embodiments, a thread may also be referred to as a stream.

To provide data for multiple threads to be executed concurrently, in some embodiments, some relevant electronic connections between components of the processor 200 may be in vectors. For example, a vector address of H×G may have H number of G bits addresses, a vector data connection of K×W may have K number of W bits data. It should also be noted that although not shown in any of the figures, data or address connections between different components may be accompanied by one or more signal lines. For example, a busy signal line may exist between a first component and a second component, and may be used by the first component to send a busy signal to the second component indicating that the first component is not ready to accept valid data or address signals. Moreover, a valid signal line may also exist between the first and second components, and may be used by the second component to send a valid signal to the first component indicating that valid data or address signals have been put on the connection wires.

The configuration memory 204 may store data path programs consisting of executable instructions and/or data loading instructions for one or more data paths. In one embodiment, the data path programs stored in the configuration memory 204 may be sequence(s) of compiled instructions. For example, a data path program may include instructions to be executed by the PE array 214, which represents configuration information to be executed by which PEs when conditions are met, and how each data path components may hold or transmit data.

The sequencer 206 may decode the instruction stored in the configuration memory 204 and move a decoded instruction into the memory unit 212 and a physical data path. The physical data path may include various components of the PE array 214 (e.g., components of the PE array 214 that will be involved in the executing on, staging and/or movement of data) and the gasket memory 216. The decoded instruction may be delivered to various components in a package, which may be referred to as a configuration package or simply a configuration. In addition to the decoded instruction, a configuration package for one component may include some other parameters (e.g., a number specifying how many times an instruction is to be repeatedly executed or how many times data passes through a data switching unit in one configuration setting). In one embodiment, a physical data path configuration may be referred to as a physical data path program, which may comprise individual configurations for various components included in a physical data path. Although not shown, there may be a configuration bus connecting the sequencer 206 to the components of a data path for individual configurations to be delivered to these components via the bus respectively.

The memory unit 212 may be a data staging area to store data received from the external bus 230 and store execution result data generated by the PE array 214 (before these results may be transmitted away via the external bus 230). In some embodiments, the memory unit 212 may be an in processor cache for a large memory system external of the processor 200. The PE array 214 may comprise a plurality of memory ports (MPs) 220.1-220.N, a plurality of switch boxes (SBs) 222.1-222.N, a plurality of processing elements (PEs) 218.1-218.N and a plurality of inter-column switch boxes (ICSBs) 224.1-224.N. In the example shown in FIG. 2, the PE array 214 may comprise one row of processing elements 218.1-218.N (e.g., one dimensional array), which may include N PEs with N being an integer number. In the embodiments described herein, the number N may be 32. But this is an example and it may be another integer number in other embodiments, such as, but not limited to, 16, 64, etc. Although these example numbers given may be power of 2, the number of PEs in one row need not be a power of 2 in one embodiment. In some embodiments, the PE array 214 may be a two-dimensional array that may comprise multiple rows of processing elements (e.g., one or more rows of PEs may be positioned underneath the PEs 218.1-218.N). It should be noted that the PE array 214 may be a composite of MPs, SBs, ICSBs and PEs for illustration purpose and used to refer to these components collectively. In some embodiments, the memory unit 212 and the MPs 220.1-220.N may be collectively referred to collectively as a multi-port memory unit.

The plurality of MPs 220.1-220.N may be gateways for data flow between the PE array 214 and the memory unit 212. Each MP 220.1-220.N may be coupled to the memory unit 212 respectively to read from and write to the memory unit 212. With the exception of MP 220.1 and MP 220.N, all MPs may be coupled to two adjacent MPs such that each MP may be configured to receive data from a first MP and/or transmit data to a second MP. The electronic coupling between MPs may provide a one-way flow of data (e.g., if one computation configuration specifies that data may flow from one MP to a next MP). For example, as shown in FIG. 2, MP 220.1 may be coupled to MP 220.2 for one-way flow of data, MP 220.2 may be coupled to MP 220.3 for one-way flow of data. The last MP 220.N may be an exception and coupled to the gasket memory 216, which may provide a temporary storage for data. The first MP 220.1 may be another exception in that it may receive one-way flow of data from the gasket memory 216. In some embodiments, the MPs 220.1-220.N may form a data routing bus along a PE row direction. That is, data may be routed between MPs in a direction that is parallel to the direction that data may be routed between PEs. In embodiments with two-dimensional PE array 214, each MP 220.1-220.N may be shared by one column of PEs. In one embodiment, the gasket memory 216 may be used as a data buffer, for example, first-in-first-out (FIFO), to collect data from the PE array and feed it back to the PE array for a new configuration.

In some embodiments, the PEs and MPs may be statically programmed with instructions for one configuration. For example, the instructions may be programmed to the PEs and MPs as a stage of pipeline and no instructions are changed during one configuration. The address computation instructions and memory access instructions like read or store may be mapped to the memory ports (MP) and other instructions may be mapped to PEs.

As illustrated in FIG. 2, each of the ICSB 224.1-224.N may be coupled to a respective SB 222.1-222.N and two adjacent ICSBs, with the exception of ICSB 224.1 and ICSB 224.N. ICSB 224.1 may be coupled to the MP 222.1, the gasket memory 216 and the ICSB 224.2. And ICSB 224.N may be coupled to the MP 222.N, the gasket memory 216 and the ICSB 224.N-1. In some embodiments, the ICSBs 220.1-220.N may form another data routing bus along a PE row direction. That is, data may be routed between ICSBs in a direction that is parallel to the direction that data may be routed between PEs. An ICSB may also be referred to as a data switching unit. In one embodiment, one or more ICSBs may be used to route data to bypass one or more PEs.

The SBs 222.1-222.N may be configured to provide data switching for neighboring PEs, PEs to data routing buses, and the data routing bus formed by the MPs 220.1-220.N and the data routing bus formed by the ICSBs 224.1-224.N. For example, the switch box 222.1 may be configured to provide data switching for data to be delivered to the processing element 218.1 from the gasket memory 216, the MP 220.1 and the ICSB 224.1. Moreover, the switch box 222.1 may be configured to route data between the gasket memory 216, the MP 220.1 and the ICSB 224.1. As another example, the switch box 222.2 may be configured to provide data switching for data to be delivered to the processing element 218.2 from the processing element 218.1, the MP 220.2 and the ICSB 224.2. Moreover, the switch box 222.2 may be configured to route data between the processing element 218.2, the MP 220.2 and the ICSB 224.2. In yet another example, the switch box 222.N may be configured to provide data switching for data to be delivered to the processing element 218.N from the PE 218.N-1, the MP 220.N and the ICSB 224.N. Moreover, the switch box 222.N may be configured to route data between PE 218.N−1, MP 220.N and ICSB 224.N. A SB may also be referred to as a data switching unit.

An exemplary data path may be illustrated by the exemplary internal connections of the SBs 222.1 to 222.N. For example, as shown in FIG. 2, SB 222.1 may show that two inputs of PE 218.1 may be coupled to two outputs from MP 220.1, SB 222.2 may show that two inputs of PE 218.2 may be coupled to two outputs from MP 220.2 and two inputs of PE 218.2 may be coupled to two outputs from PE 218.1, SB 222.3 may show that two inputs of PE 218.3 may be coupled to two outputs from MP 220.3 and two inputs of PE 218.3 may be coupled to two outputs from PE 218.2, and so forth, until SB 222.N may show that two inputs of PE 218.N may be coupled to two outputs from MP 220.N and two inputs of PE 218.N may be coupled to two outputs from PE 218.N−1.

To simplify wording, a MP 220 may refer to one of the MPs 220.1-220.N, a SB 222 may refer to one of the SBs 222.1-222.N, a PE 218 may refer to one of the PEs 218.1-218.N and an ICSB 224 may refer to one of the ICSB 224.1-224.N.

Figure 3A:
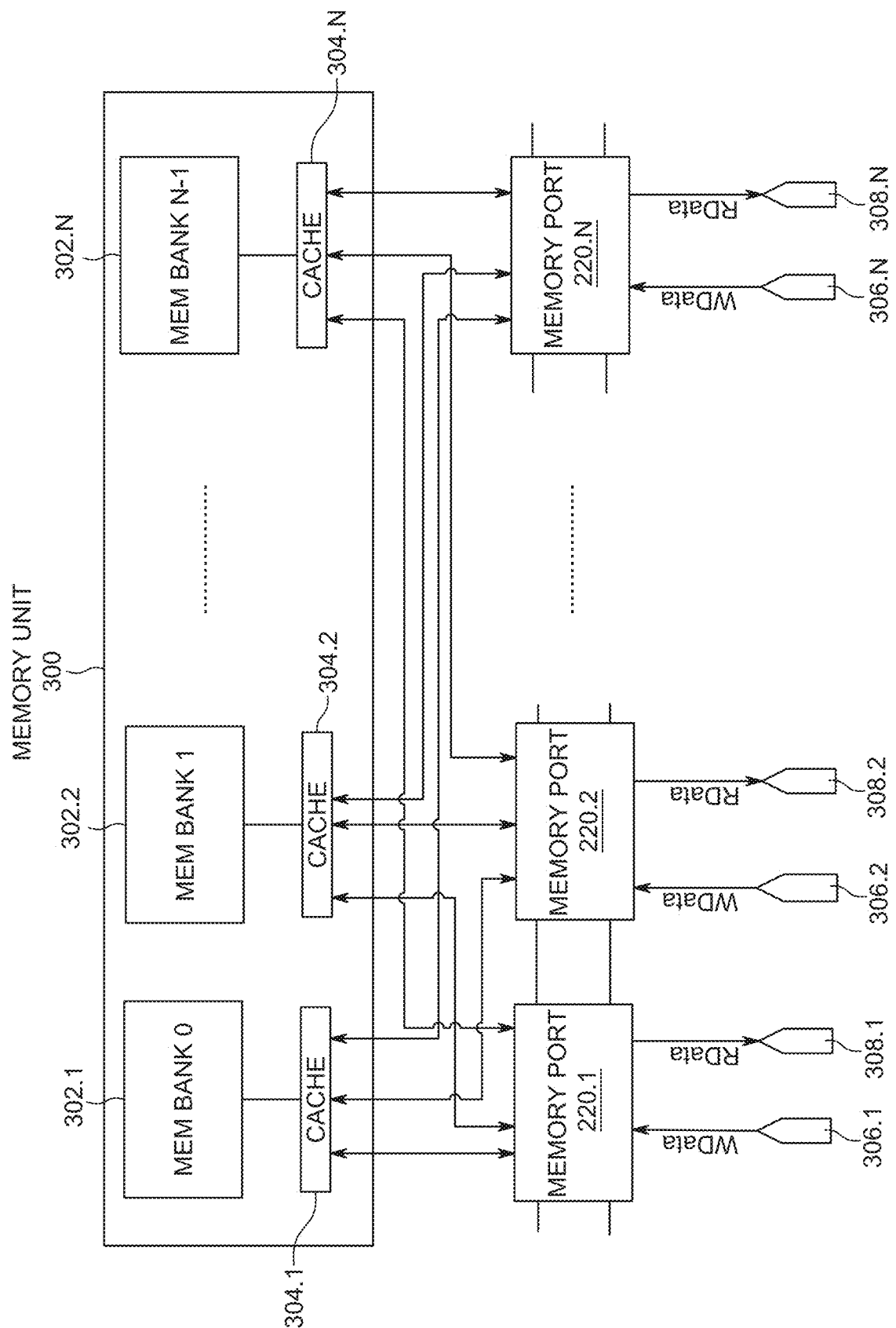
FIG. 3A schematically shows a memory system for a processor in accordance with an embodiment of the present disclosure.

FIG. 3A schematically shows a memory system for a processor in accordance with an embodiment of the present disclosure. The memory system may comprise a memory unit 300 and the plurality of memory ports 220.1 through 220.N. The memory unit 300 may be an embodiment of the memory unit 212 in FIG. 2, and may comprise a plurality of memory banks (e.g., memory bank 0 denoted as 302.1, memory bank 1 denoted as 302.N, memory bank N−1 denoted as 302.N, etc.) and a plurality of memory caches 304.1 through 304.N. Each of the memory bank 302 may be coupled to a respective cache 304. For example, the memory bank 302.1 may be coupled to the cache 304.1, the memory bank 302.2 may be coupled to the cache 304.2, the memory bank 302.N may be coupled to the cache 304.N, and so on. Each cache 304 may be individually coupled to all of the plurality of memory ports 220.1-220.N. For example, the cache 304.1 may be coupled to the MPs 220.1-220.N, the cache 304.2 may be coupled to the MPs 220.1-220.N, the cache 304.N may be coupled to the MPs 220.1-220.N, and so on.

In addition to being individually coupled to all caches 304.1-304.N of the memory unit 300, the MPs 220.1-220.N may be chained to form the row direction data routing bus, with the MP 220.1 and the MP 220.N being coupled at one end to the gasket memory 216 respectively (shown in FIG. 2). Each of MPs 220.1-220.N may further comprise a write data (WData) input 306 and a read data (RData) output 308. For example, the MP 220.1 may comprise a write data input 306.1 and a read data output 308.1, the MP 220.2 may comprise a write data input 306.2 and a read data output 308.2, the MP 220.N may comprise a write data input 306.N and a read data output 308.N, and so on. The write data inputs 306 and read data outputs 308 may be coupled to respective outputs and inputs of the SBs 222.1-222.N. In one embodiment, each of the write data inputs 306 and each of the read data outputs 308 may be configured for vector data connections. For example, the write data input 306.1 may be a 32×32 input or two 32×16 inputs, and the read data output 308.1 may be a 32×32 output or two 32×16 outputs. As used herein, a data input or data output may also be referred to a data port.

The memory unit 300 and MPs 220.1-220.N may support two accessing modes: a private memory access mode and a shared memory access mode, which may also be referred to as the private memory access method and shared memory access method. In one MP, multiple data units may be read or written using a vector address. These addresses of one vector may be different from each other. In the private memory access mode, one address in a vector address may be routed to one memory bank according to the thread index. All private data for one thread may be located in the same memory bank. In shared memory access mode, each MP may access anywhere in the defined region regardless of thread index. Data shared to all threads may be spread in all memory banks.

The memory unit structure is illustrated as one example. For each column of a PE array, it may have one MP with multiple buses going through. The memory port may be configured as shared (e.g., shared memory access mode) or private (e.g., private memory access mode). Each memory port may be further coupled to a data cache network.

Figure 3B:
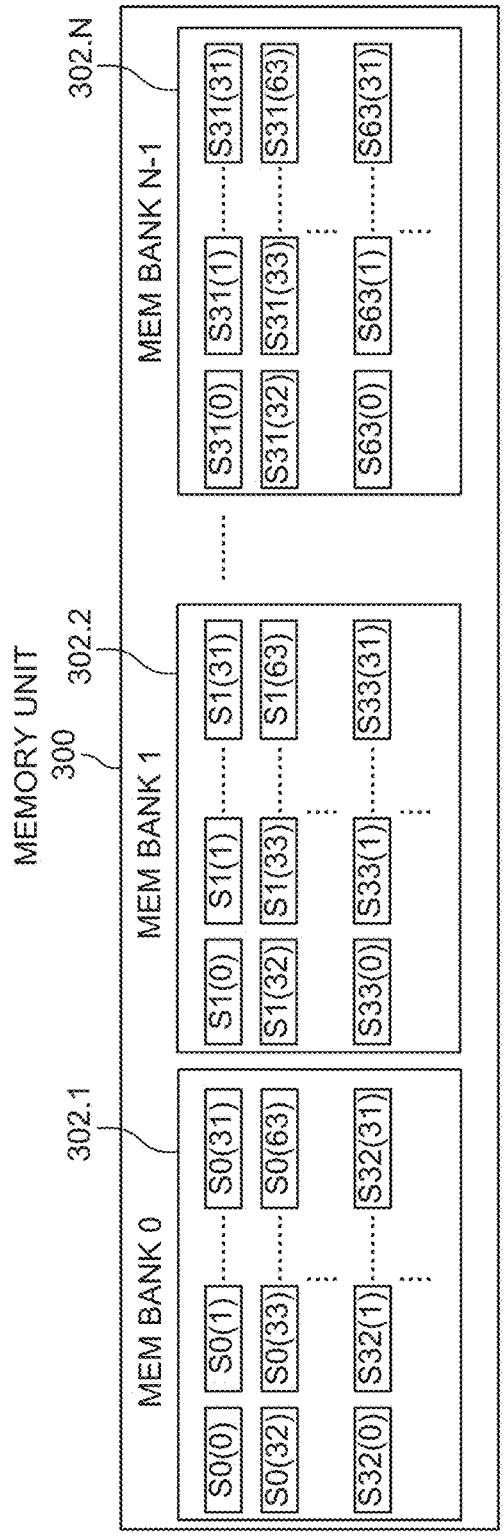
FIG. 3B schematically shows a first memory mapping for a private memory access mode in accordance with an embodiment of the present disclosure.

FIG. 3B schematically shows a first memory mapping for a private memory access mode in accordance with an embodiment of the present disclosure. Each memory bank 302.1 through 302.N may comprise a plurality of "words." In the embodiment shown in FIG. 3B, each word of the memory bank may be 512-bit wide and may contain 32 data units that each may be 16 bits. Consecutive data units of a thread "i" may be referred to as $Si(0)$, $Si(1)$, . . . , and stored in a memory bank-i. For example, data units $S0(0)$, $S0(1)$, through $S0(31)$ for thread zero ("0") may be stored in the first word in the memory bank 302.1, and data units $S0(32)$, $S0(33)$, through $S0(63)$ for thread 0 may be stored in the second word in the memory bank 302.1, and so on. Similarly, data units $S1(0)$, $S1(1)$, through $S1(31)$ for thread one ("1") may be stored in the first word in the memory bank 302.2, and data units $S1(32)$, $S1(33)$, through $S1(63)$ for thread 1 may be stored in the second word in the memory bank 302.2, and so on. And data units $S31(0)$, $S31(1)$, through $S31(31)$ for thread 31 may be stored in the first word in the memory bank 302.N, and data units $S31(32)$, $S31(33)$, through $S31(63)$ for thread 31 may be stored in the second word in the memory bank N−1, and so on.

In one embodiment of this first memory mapping, data units for different threads may be intended to be stored in different memory banks and wrap back to the first bank for thread N. For example, for N equal to 32, data units for the $32^{nd}$ thread may be stored to memory bank 0 (e.g., data units $S32(0)$ through $S32(31)$ in memory bank 0), data units for the $33^{rd}$ thread may be stored to memory bank 1 (e.g., data units $S33(0)$ through $S33(31)$ in memory bank 1), data units for the $63^{rd}$ thread may be stored to memory bank N−1 (e.g., data units $S63(0)$ through $S63(31)$ in memory bank 0), and so on.

Figure 3C:
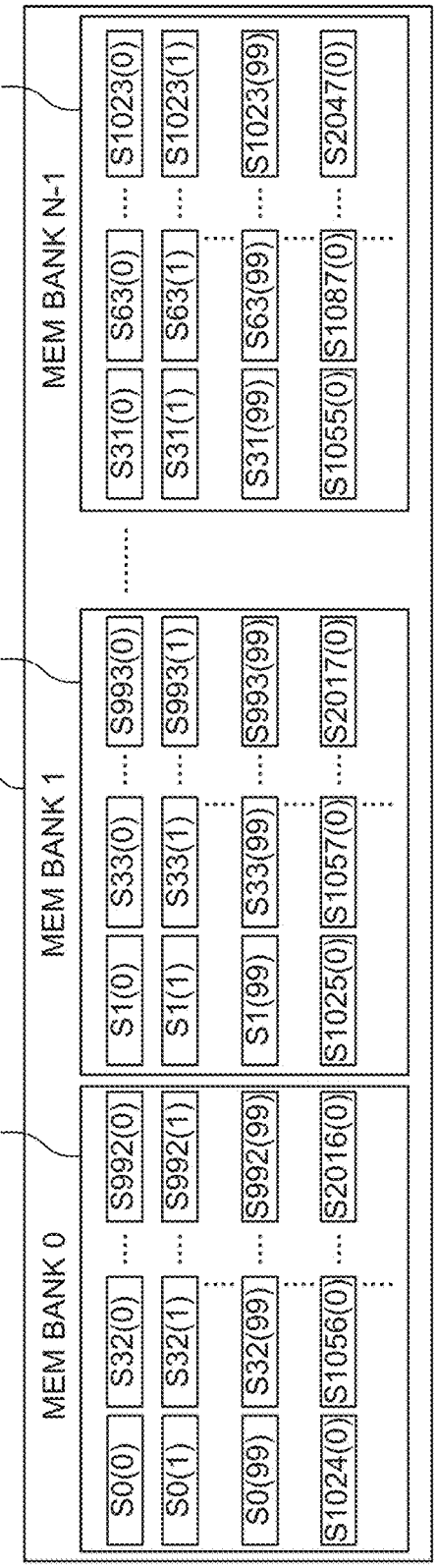
FIG. 3C schematically shows a second memory mapping for a private memory access mode in accordance with an embodiment of the present disclosure.

For the same memory structure of FIG. 3B, data could be mapped in a different way. FIG. 3C schematically shows a second memory mapping for a private memory access mode in accordance with an embodiment of the present disclosure. The memory unit 300 shown in FIG. 3C may comprise the same plurality of memory banks as in FIG. 3A, and each word in the memory banks 302.1-302.N of FIG. 3C may also be 512 bits wide and each data unit be 16 bits wide. Consecutive data units of a thread i may still be stored in a memory bank-i but in different words. For example, data units $S0(0)$, $S0(1)$ and so on for thread 0 may be stored in different words in a column direction in memory bank 302.1; data units $S1(0)$, $S1(1)$ and so on for thread 1 may be stored in different words in a column direction in memory bank 302.2; data units $S31(0)$, $S31(1)$ and so on for thread 31 may be stored in different words in a column direction in memory bank 302.N; and so on.

In one embodiment of this second memory mapping, data units for different threads may be intended to be stored in different memory banks and wrap back to the first bank for thread N and integer multiple of N (e.g., 2N, 3N, etc.). Moreover, data units of a group of different threads with same index may be mapped to the same word of a memory bank. For example, for N equal to 32, data units for the $32^{nd}$ thread may be stored to memory bank 302.1 in different words (e.g., data units S32(0) through S32(99) in memory bank 302.1 in a second column, with data units S0($m$) and S32($m$) in the same word, m being the index of the data unit in a thread), data units for the $33^{rd}$ thread may be stored to memory bank 302.2 in different words (e.g., data units S33(0) through S33(99) in memory bank 302.2 in a second column, with data units S1($m$) and S33($m$) in the same word, m being the index of the data unit in a thread), data units for the $63^{rd}$ thread may be stored to memory bank 302.N (e.g., data units S63(0) through S63(99) in memory bank 0, with data units S31($m$) and S63($m$) in the same word, m being the index of the data unit in a thread), and so on. Because each word has 32 data units, the last data unit in the first row of memory bank 302.1 may be the first data unit S992(0) of the thread 992, the last data unit in the first row of memory bank 302.2 may be the first data unit S993(0) of the thread 993, and so on until the last data unit in the first row of memory bank 302.N may be the first data unit S1023(0) of the thread 1023. It should be noted that a thread may have more than 99 data units and Si(99) (e.g., S0(99), etc.) may not be the last data units for a thread and dotted lines may represent that more data units may exist and stored in a memory bank.

The data units for thread 1024 and higher number of threads may be wrapped from the first column of memory bank 0 and so on. For example, with m being the index, data units for threads 1024, 1056 and so on until 2016 (e.g., S1024($m$), S1056($m$) and so on until S2016($m$)) may be in one word of the memory bank 0; data units for threads 1025, 1057 and so on until 1057 (e.g., S1025($m$), 51057($m$) and so on until S2017($m$)) may be in one word of the memory bank 1; and data units for threads 1055, 1087 and so on until 2047 (e.g., S1055($m$), 51087($m$) and so on until S2047($m$)) may be in one word of the memory bank N−1.

Figure 3D:
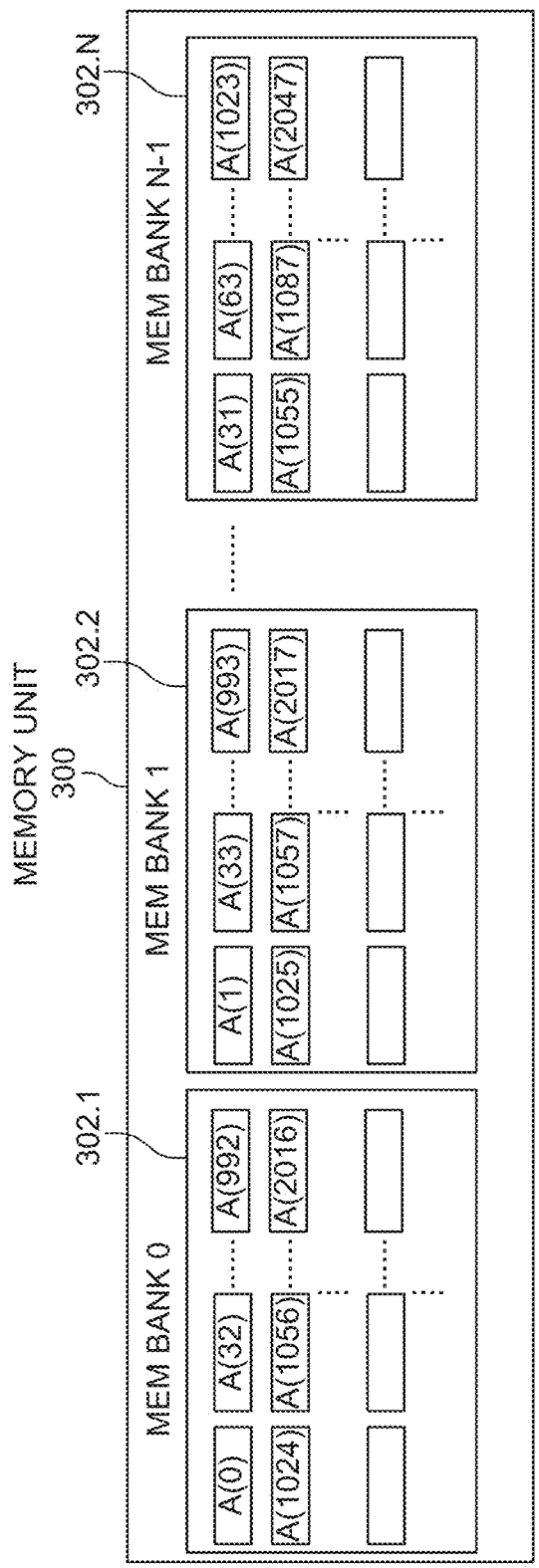
FIG. 3D schematically shows a memory mapping for a shared memory access in accordance with an embodiment of the present disclosure.

FIG. 3D schematically shows one example of memory mapping for a shared memory access in accordance with an embodiment of the present disclosure. The memory unit 300 shown in FIG. 3D may comprise the same plurality of memory banks as in FIG. 3A, each word in the memory banks 302.1-302.N of FIG. 3D may also be 512 bits wide and each data unit be 16 bits wide. In this example memory mapping for shared memory access, consecutive data units A(0), A(1), . . . , may be stored in different memory banks in interleaved fashion. For example, for N equal to 32, A(0), A(1), A(2), and so on may be spread out in N memory banks, with A(0) in memory bank 0, A(1) in memory bank 1, and so on until A(31) in memory bank N−1; and wrap back with A(N) in memory bank 0 in the same word as A(0), A(N+1) in memory bank 1 in the same word as A(1), and so on, until A(N+31) in memory bank N−1 in the same word as A(31); and wrap back and so on, until A(992) (e.g. A(31N)) in memory bank 0 in the same word as A(0), A(993) (e.g., A(31N+1)) in memory bank 1 in the same word as A(1), and so on until A(1023) (e.g., A(31N+31)) memory bank N−1 in the same word as A(31). After one word of a memory bank may be filled, more consecutive data units may be spread in another word in the memory banks. For example, A(1024), A(1056), through A(2016) may be in another word in memory bank 0; A(1025), A(1057), through A(2017) may be in another word in memory bank 1; and so on, until A(1055), A(1087), through A(2047) may be in another word in memory bank N−1.

Regardless of private or shared memory access modes, each of the caches 304.1-304.N of a memory unit 300 may comprise multiple cache lines that each may temporarily store a memory word from a corresponding memory bank. For example, cache 304.1 may comprise multiple cache lines that each may be configured to temporarily store one word retrieved from the memory bank 302.1 (e.g., memory bank 0), cache 304.2 may comprise multiple cache lines each configured to temporarily store one word retrieved from the memory bank 302.2 (e.g., memory bank 1), cache 304.N may comprise multiple cache lines each configured to temporarily store one word retrieved from the memory bank 302.N (e.g., memory bank N−1), and so on. A cache miss may be generated when one or more data pieces (e.g., one or more data units) requested are not in the cache. In one embodiment, one memory word of a memory bank of the memory unit 300 (e.g., in either FIG. 3B, FIG. 3C or FIG. 3D) may be fetched as one cache line into a cache when there is a cache miss. Generally, the larger the cache size, more cache lines may be used to store memory words and the lower cache miss rate may be expected. In some embodiments, storage units in a cache may be implemented as registers.

Data storage in the memory unit 212 may be accessed by the MPs 220.1-220.N via the caches 304.1-304.N. The memory ports (MP) at each column may be configured with same components to carry out the memory operations, for example, calculating addresses and issuing read and/or store operations. In some embodiments, one cache 304 may be accessed by multiple MPs at the same time. Each of the MPs may be configured to provide the two accessing modes: the private memory access mode and the shared memory access mode. Due to the nature of SIMT, memory read or write instructions mapped to a MP for different threads belong to the same type, either shared or private. Moreover, a MP may be configured for private or shared memory access mode for a duration of a configuration.

Figure 4A:
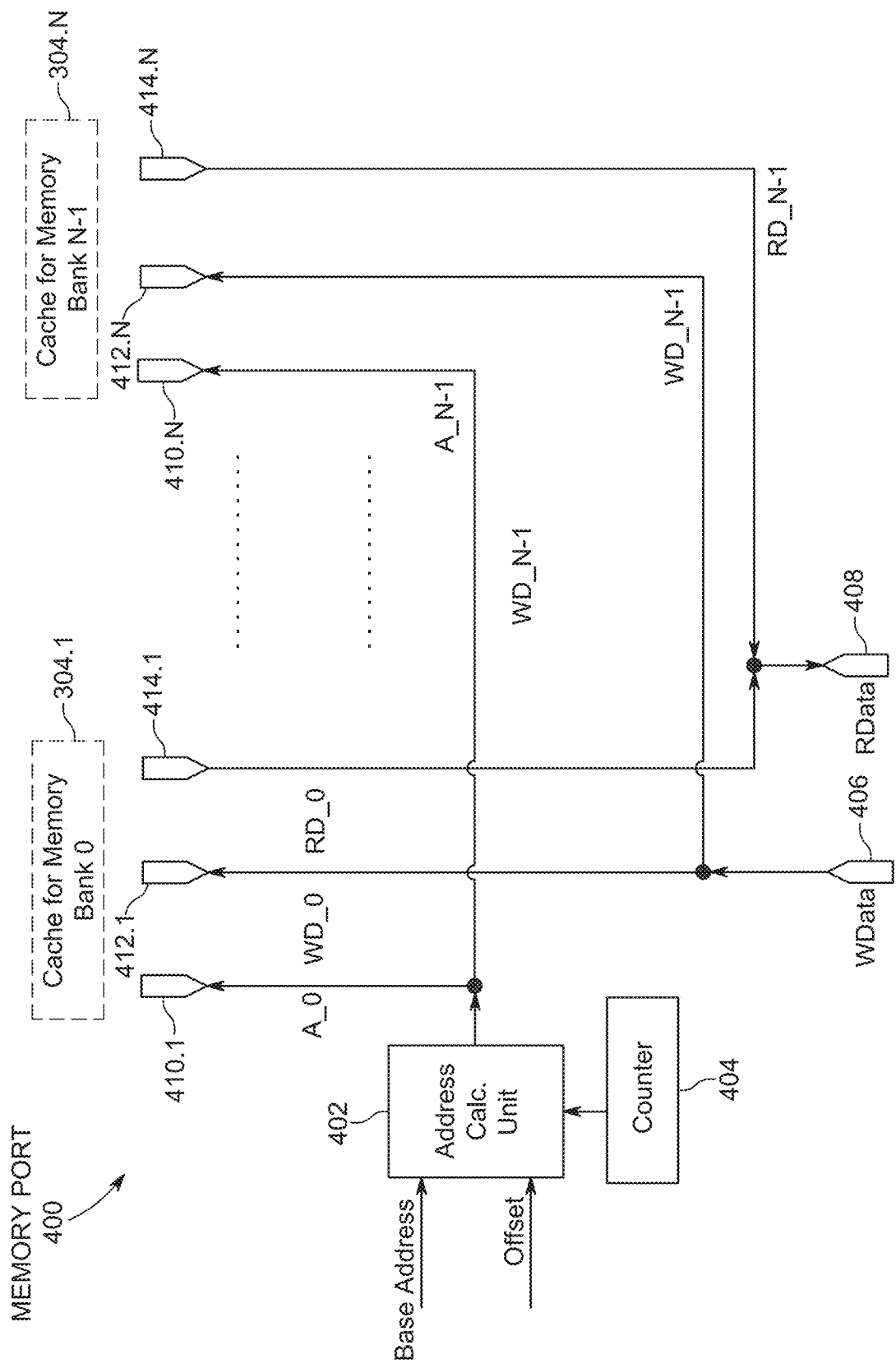
FIG. 4A schematically shows a first memory access configuration for a memory port in accordance with an embodiment of the present disclosure.

FIG. 4A schematically shows a first memory access configuration for a memory port (MP) 400 in accordance with an embodiment of the present disclosure. The MP 400 may be an embodiment of a memory port 220. The first memory access configuration shown in FIG. 4A may be one example configuration for the private memory access mode. During operation, the MP 400 may receive a memory port (MP) configuration for a physical data path from the sequencer and the MP configuration may specify that for this physical data path the MP 400 may be configured for the private memory access mode. The MP 400 may comprise an address calculation unit 402 and a counter 404. The address calculation unit 402 may take a base address as a first input, an offset as a second input, and a third input from the counter 404. The base address may be a common address for all threads. The offset may be coupled to an address input port of the MP 400, which may be configured to accept a vector address. The vector address may comprise individual addresses for each concurrent thread and these addresses may be referred to as address offsets. In one embodiment, the base address in the first memory access configuration may contain the starting address of the thread-0 data unit 0, e.g., S0(0). The number of concurrent threads may be limited by the number of ALUs in a PE, and the width of the vector address and vector data bus. For example, if the number of ALUs in a ALU vector of a PE is N, and the vector address may comprise N addresses and vector data bus may comprise N data buses, there may be N concurrent threads. The offset input may be the vector address for the N-threads. Each address offset (e.g., each address of the vector address) may be independently programmed/calculated.

The third input from the counter 404 may provide thread numbers (e.g., indexes) for the address calculation unit 402 and therefore, the counter 404 may be referred to as a thread counter. In one embodiment, the address vector, read data vector and write data vector may be simply split into each memory bank with a one-to-one mapping so that the data of different threads may be mapped into different memory banks. For example, the i-th address in the vector address may be for thread i (lower case letter "i" to denote a thread number, which may start from zero for the first thread), and the counter 404 may provide a thread number vector to the address calculation unit 402 so the address calculation unit 402 may generate N addresses as A_0, A_1 . . . , A_N−1 in this example corresponding to the vector size of ALU. Each address in the vector address may be mapped to an address A_i and a corresponding address output for a corresponding memory bank (e.g., A_0 coupled to the address port 410.1 for the memory bank 0 cache 304.1, A_N−1 coupled to the address port 410.N for memory bank N−1 cache 304.N, etc.). The i-th data lines in the vector write data port WData 406 may be mapped to WD_i (e.g., WD_0 coupled to the write data port 412.1 for memory bank 0 cache 304.1, WD_N−1 coupled to the write data port 412.N for memory bank N−1 cache 304.N, etc.). The i-th data lines in the vector read data port RData 408 may be mapped to RD_i (e.g., RD_0 coupled to the read data port 414.1 for memory bank 0 cache 304.1, RD_N−1 coupled to the read data port 414.N for memory bank N−1 cache 304.N, etc.). No bus switch may be needed for this configuration and there may be no memory contention at this level.

It should be noted that the number of memory banks does not need to be identical to the vector size. For example, a vector (e.g., vector ALU, vector address, vector data ports) may have a vector size=V, a PE array may have a number of columns=N, and a memory unit may have a number of memory banks=M, and V, N and M may be all different. For convenience, the capital letter N may be used herein to denote the vector size, the number of columns of PEs, and the number of memory banks, but the number represented by N may be equal or different in different components.

For thread numbers larger than the number N, the address calculation unit 402 and the counter 404 may generate a memory mapping that wraps around to N memory banks. For example, thread 32 may be mapped to memory bank 0 cache 304.1 (e.g., S32(0) to memory bank 302.1 in FIGS. 3B and 3C), thread 63 may be mapped to memory bank N−1 cache 304.N (e.g., S63(0) to memory bank 302.N in FIGS. 3B and 3C).

Figure 4B:
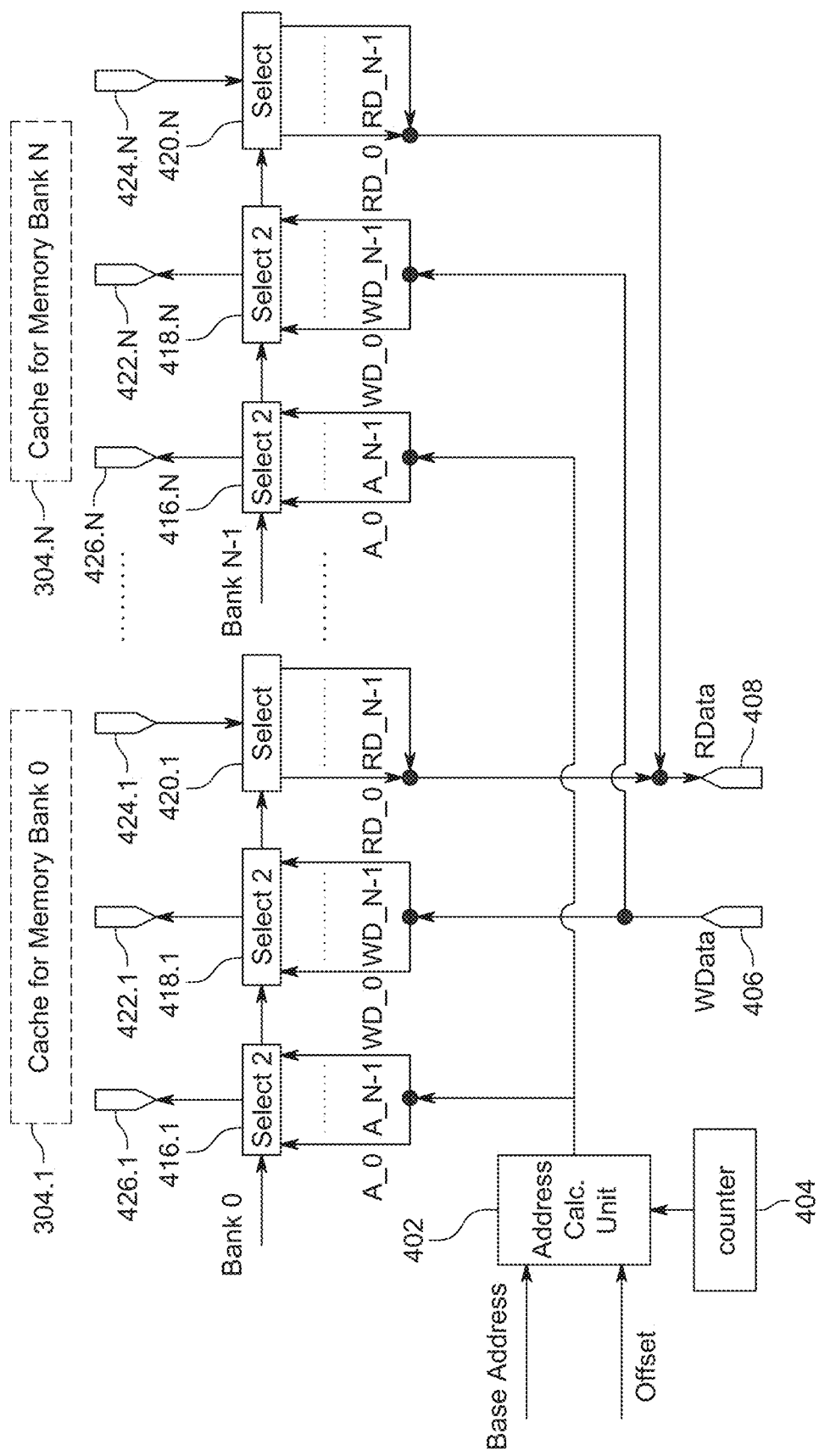
FIG. 4B schematically shows a second memory access configuration for a memory port in accordance with an embodiment of the present disclosure.

FIG. 4B schematically shows a second memory access configuration for the MP 400 in accordance with an embodiment of the present disclosure. The second memory access configuration shown in FIG. 4B may be one example configuration for the shared memory access mode. During operation, the MP 400 may receive a memory port (MP) configuration for a physical data path from the sequencer and the MP configuration may specify that for this physical data path the MP 400 may be configured for the shared memory access mode. The address calculation unit 402 may take the base address as a first input and the offset as a second input, same as the first memory access configuration in FIG. 4A. But the counter 404 is not used in the shared memory access mode and the input from the counter 404 may be ignored. The base address of the shared memory is common to all the threads but the offsets could be different from each thread. The address calculation unit 402 may generate N addresses as A_0, A_1 . . . , A_N−1 in this example corresponding to the vector size of ALU. In contrast to the first memory access configuration in FIG. 4A, in which each address A_i may be mapped to one memory bank, in the second memory access configuration, the N addresses from the address calculation unit 402 may be delivered to a plurality of address selection units (e.g., "Select 2" units 416.1 through 416.N). Each address selection unit 416.1 through 416.N may also take a mask as an input, for example, "Bank 0", . . . , and "Bank N−1", and addresses targeted to a particular memory bank may be arbitrated by a respective selection unit such that a few addresses may be selected. The upper number of addresses that may be selected may depend on design considerations, for example, 2, 3 or more. And because the vector address may have a fixed number of addresses, if more than one address is directed to one memory bank, there may be one or more memory banks that have no addresses directed to. The selected addresses may be mapped to a memory port for a memory bank cache (e.g., address port 426.1 for memory bank 0 cache 304.1, address port 426.N for memory bank N−1 cache 304.N, etc.). In one embodiment, for example, up to two addresses may be selected from N addresses and each address port 426.1 through 426.N may be configured to deliver up to two memory addresses for a corresponding memory bank.

Because more than one address may be selected for one memory bank, write data selection units (e.g., "Select 2" units 418.1 through 418.N) and read data selection units (e.g., "Select" units 420.1 through 420.N) may be provided to map multiple data ports from the vector data ports WData 406 and RData 408 to one memory bank. Each of the write data selection unit 418.1 through 418.N may take an input from a corresponding data selection unit 416.1 through 416.N, and map multiple write data lines from the write data lines WD_0 through WD_N−1 to a corresponding write data port for a selected memory bank (e.g., write data port 422.1 for memory bank 0 cache 304.1, write data port 422.N for memory bank N−1 cache 304.N). Each of the read data selection unit 420.1 through 420.N may take an input from a corresponding data selection unit 416.1 through 416.N passed over by a corresponding selection unit 418.1 through 418.N, and map multiple read data lines from the read data lines RD_0 through RD_N−1 to a corresponding read data port for a selected memory bank (e.g., read data port 424.1 for memory bank 0 cache 304.1, read data port 424.N for memory bank N−1 cache 304.N). In an embodiment in which up to two addresses may be selected from N addresses, the width of the address ports 426.1 through 426.N, the write data ports 422.1 through 422.N and the read data ports 424.1 through 424.N may be doubled of that of the address ports 410.1 through 410.N, the write data ports 412.1 through 412.N and the read data ports 414.N.

Embodiments of a processor may comprise a large amount of ALUs and support massive amount of parallel threads. The memory access could be very busy. It may be extremely expensive to use multiport memory to meet the requirement. The complexity may also become very high if large amount of memory banks is used. The example private memory access may reduce the complexity of memory structure and support many typical memory access patterns for parallel processing. Some typical private memory access patterns are listed below.

TABLE 1

PRIVATE MEMORY ACCESS PATTERNS

Memory Access Pattern for Private Memory Access

1) One column mode: One MP may access the memory unit for all threads (all executing same instruction) in one PE, arbitrary and independent offset may be used for each ALU thread. I.e., {a0 = C0, a1 = C1, . . . , a31 = C31}, where C0 may be the address offset for thread-0, C1 may be the address offset for thread-1. There may be not memory contention in this case due to explicit memory partitioning for different threads accessing data located in different memory banks.
2) Linear mode: Multiple MPs may access the memory unit for concurrent threads in different PEs, address offsets for each MP may be linear. For example, for concurrent threads in a first PE, the address offsets may be {a0 = C, a1 = C, . . . , a31 = C} for a first MP, for concurrent threads in a second PE, the address offsets may be {b0 = C + 1, b1 = C + 1, . . . , b31 = C + 1} for a second MP, and so on for other concurrent threads in other PEs.
3) Reverse linear mode: Multiple MPs may access the memory unit for concurrent threads in different PEs, address offsets for each MP may be reverse linear. For example, for concurrent threads in a first PE, the address offsets may be {a0 = C, a1 = C, . . . , a31 = C} for a first MP, for concurrent threads in a second PE, the address offsets may be {b0 = C − 1, b1 = C − 1, . . . , b31 = C − 1} for a second MP, and so on for other concurrent threads in other PEs
4) Overlap mode: Multiple MPs may access the memory unit for concurrent threads in different PEs, address offsets for each MP may be overlapped. For example, for concurrent threads in a first PE, the address offsets may be {a0 = C, a1 = C + 1, . . . , a31 = C + 31} for a first MP, for concurrent threads in a second PE, the address offsets may be {b0 = C + 1, b1 = C + 2, . . . , b31 = C + 32} for a second MP, and so on for other concurrent threads in other PEs
5) Non-unity stride mode: Multiple MPs may access the memory unit for concurrent threads in different PEs, address offsets from each MP may be spaced by a stride D. For example, for concurrent threads in a first PE, the address offsets may be {a0 = C, a1 = C, . . . , a31 = C} for a first MP, for concurrent threads in a second PE, the address offsets may be {b0 = C + D, b1 = C + D, . . . , b31 = C + D} for a second MP, for concurrent threads in a third PE, the address offsets may be {c0 = C + 2D, c1 = C + 3D, . . . , c31 = C + 3D} for a third MP, and so on for other concurrent threads in other PEs
6) Random mode: Multiple MPs may access the memory unit for concurrent threads in different PEs, address offsets from each MP may be random numbers. For example, for concurrent threads in a first PE, the address offsets may be may be {a0 = n_0, 0, a1 = n_0, 1, . . . , a31 = n_0, 31} for a first MP, for concurrent threads in a second PE, the address offsets may be {b0 = n_1, 0, b1 = n_2, 0, . . . , b31 = n_31, 0} for a second MP, and so on for other concurrent threads in other PEs, where n_(i, j) may be different random numbers.

In some embodiments, the private memory access may allow random data access from all threads at the same time but to different memory area for each thread. This enables programmers to write software in conventional style, without complicated data vectorization and detailed knowledge of underlying processor hardware architecture. This may enable same-instruction-multiple-thread (SIMT) programming to be applicable to an embodiment of a PE array. That is, one instruction may be concurrently executed by multiple threads in one PE.

Due to the non-overlapping nature, the total throughput may be the sum of throughputs of all threads. Embodiments of the private memory access mode may support large throughput from simultaneous access from each thread. The first and second memory data mapping may allow minimum memory contention in typical private data access patterns. Embodiments of private memory access may also reduce the complexity of memory system. The number of memory banks may be significantly reduced. The parallel cache structure may also reduce the total cache size since each content in the cache may be unique. Moreover, embodiments of private memory access may significantly reduce access to the memory banks by allowing simultaneous cache access from multiple memory ports.

In one embodiment, for a PE array size with 32×32 ALUs, only 32 memory banks may be required using the private memory access configuration (e.g., as shown in FIG. 4A). This may greatly reduce the number of memory banks from 1024 memory banks for a conventional design to support different addresses used by each thread.

Different memory access patterns may use different mapping methods, both mappings in FIG. 3B and FIG. 3C may be supported by an embodiment of the memory access configuration shown in FIG. 4A using an address generation instruction.

The first memory mapping in FIG. 3B may be good to handle case-1, case-2, case-3 and case-4 in Table 1. In case-6 in Table 1, if the range is within the cache size, it also can be handled well. The second memory mapping in FIG. 3C may be good to handle case-1, case-2, case-3, and case-5 in Table 1.

In some embodiments, register spilling may occur. Register spilling may refer to scenarios that when a compiler is generating machine code, there are more live variables than the number of registers the machine may have and thus some variables may be transferred or spilled to memory. Memory for register spilling may be private to each thread, these spilled variables may need to be stored in private memory. Due to the fact that all address offset for register spilling may be identical to each thread, they are similar to Non-unity stride mode in case-5 of Table 1 and the spilled variables may be stored using the second memory mapping as shown in FIG. 3C, and there may be no memory contention.

The example shared memory access mode may also reduce the complexity of memory structure and support many typical memory access patterns for parallel processing. Some typical shared memory access patterns are listed below. This may greatly reduce the number of memory banks from 1024 memory banks for a conventional design to support different addresses used by each thread.

TABLE 2

SHARED MEMORY ACCESS PATTERNS

Memory Access Pattern for Shared Memory Access

1) One MP may access the memory unit for all threads in one PE, same addresses for all these concurrent threads. For example, the address offsets may be $\{a0 = C, a1 = C, \ldots, a31 = C\}$ for the concurrent threads
2) Multiple MPs may access the memory unit for concurrent threads in different PEs, address offsets may be the same within one MP but different for different MPs. For example, for concurrent threads in a first PE, the address offsets may be $\{a0 = C1, a1 = C1, \ldots, a31 = C1\}$ for a first MP, for concurrent threads in a second PE, the address offsets may be $\{b0 = C2, b1 = C2, \ldots, b31 = C2\}$ for a second MP, and so on for other concurrent threads in other PEs
3) One MP may access the memory unit for all threads in one PE, the addresses may be sequential, for example, the address offsets may be $\{a0 = C, a1 = C + 1, \ldots, a31 = C + 31\}$ for the concurrent threads
4) Multiple MPs may access the memory unit for concurrent threads in different PEs, for example, for concurrent threads in a first PE, the address offsets may be $\{a0 = C1, a1 = C1 + 1, \ldots, a31 = C1 + 31\}$ for a first MP, for concurrent threads in a second PE, the address offsets may be b$\{b0 = C2, b1 = C2 + 1, \ldots, b31 = C2 + 31\}$ for a second MP, and so on for other concurrent threads in other PEs
5) One MP may access the memory unit for all threads in one PE, address may be sequential with discontinuity, for example, the address offsets may be $\{a0 = C1, a1 = C1 + 1, a2 = C1 + K1, a3 = C2 + K1 + 1 \ldots,\}$ for the concurrent threads
6) Multiple MPs may access the memory unit for different concurrent threads in different PEs, address may be sequential with discontinuity, for example, for concurrent threads in a first PE, the address offsets may be $\{a0 = C1, a1 = C1 + 1, a2 = C1 + K1, a3 = C2 + K1 + 1 \ldots,\}$ for a first MP, for concurrent threads in a second PE, the address offsets may be $\{b0 = C2, b1 = C2 + 1, b2 = C2 + K2, b3 = C2 + K2 + 1 \ldots,\}$ for a second MP, etc.
7) One MP may access the memory unit for all threads in one PE, address may be linear with non-unity stride, for example, the address offsets may be $\{a0 = C1, a1 = C1 + K, a2 = C1 + 2K, a3 = C2 + 3K \ldots,\}$ for the concurrent threads
8) One MP may access the memory unit for all threads in one PE, addresses may be random but within a small range, for example, the address offsets may be $\{a0 = n0, a0 = n1, a2 = n2, a3 = n3 \ldots,\}$, where $n0, n1, n2, \ldots, \in (C, C + R)$, which may mean $n0, n1, n2, \ldots$, are in the range of C to C + R, the range C to C + R may be what can be stored in the overall memory cache (e.g., R may be the capacity of all memory caches combined, and data stored in memory addresses C to C + R may be loaded and distributed across all memory caches at the same time)
9) Multiple MPs may access the memory unit for concurrent threads in different PEs, addresses may be random but with a small range, for example, for concurrent threads in a first PE, the address offsets may be $\{a0 = n00, a1 = n01, a2 = n02, \ldots,\}$ for a first MP, for concurrent threads in a second PE, the address offsets may be $\{b0 = n10, b1 = n11, a2 = n12, \ldots,\}$ for a second MP, etc., where $n00, \ldots, n3131 \in (C, C + R)$ In some embodiments, the shared memory access may allow random data accesses from each parallel thread at the same time. All threads may access anywhere in a common area in the memory unit. In one embodiment, the common area may be a shared memory space that includes all memory banks. In another embodiment, the common area may be a shared memory space across a plurality of memory banks. This may enable programmers to write software in conventional style, without complicated data vectorization and detailed knowledge of underlying processor hardware architecture. This may also enable SIMT programming to be applicable to an embodiment of a PE array.

Embodiments of shared memory access may reduce the complexity of memory system. The number of memory banks may be significantly reduced. The parallel cache structure may also reduce the total cache size since each content in the cache may be unique. Moreover, embodiments of shared memory access may significantly reduce access to the memory banks by allowing simultaneous cache access from multiple memory ports.

In one embodiment, for a PE array size with 32×32 ALUs, only 32 memory banks may be needed using the shared memory access configuration (e.g., as shown in FIG. 4B).

It should be noted that as shown in FIG. 2, each MP may provide two read data ports (two arrows from the memory unit 212 to a MP and two arrows to a corresponding SB, e.g., for MP 220.1, two arrows from the memory unit 212 at the top and two arrows to SB 222.1 at the bottom) and two write data ports (two arrows to the memory unit 212 and two arrows from a corresponding SB, e.g., for MP 220.1, two arrows from the memory unit 212 at the top and two arrows to SB 222.1 at the bottom), in addition to two inputs and outputs from and to a next MP or the gasket memory 216 (e.g., two horizontal arrows from left to right between the MPs, and from MP 220.N to the gasket memory 216 and from the gasket memory 216 to the MP 220.1). That is, in some embodiments, a MP 400 may have a duplicate set of components shown in FIGS. 4A and 4B to provide two concurrent memory access for two concurrent data access operations, for example, two reads, two writes, or one read and one write. In some embodiments, the two concurrent data access operations may be vector data operations. That is, the two read operations may be two vector data reads (e.g., reading 2N pieces of data, with N being the number of concurrent threads), the two write operations may be two vector data writes (e.g., writing 2N pieces of data, with N being the number of concurrent threads), and the one read and one write operations may be one vector data read and one vector data write (e.g., reading N pieces of data and writing N pieces of data with N being the number of concurrent threads). In one embodiment, for example, to perform concurrent one read and one write operations, a MP may read N pieces of data for a PE in the same column and at the same time write N pieces of data generated from a PE in a preceding column.

Figure 5:
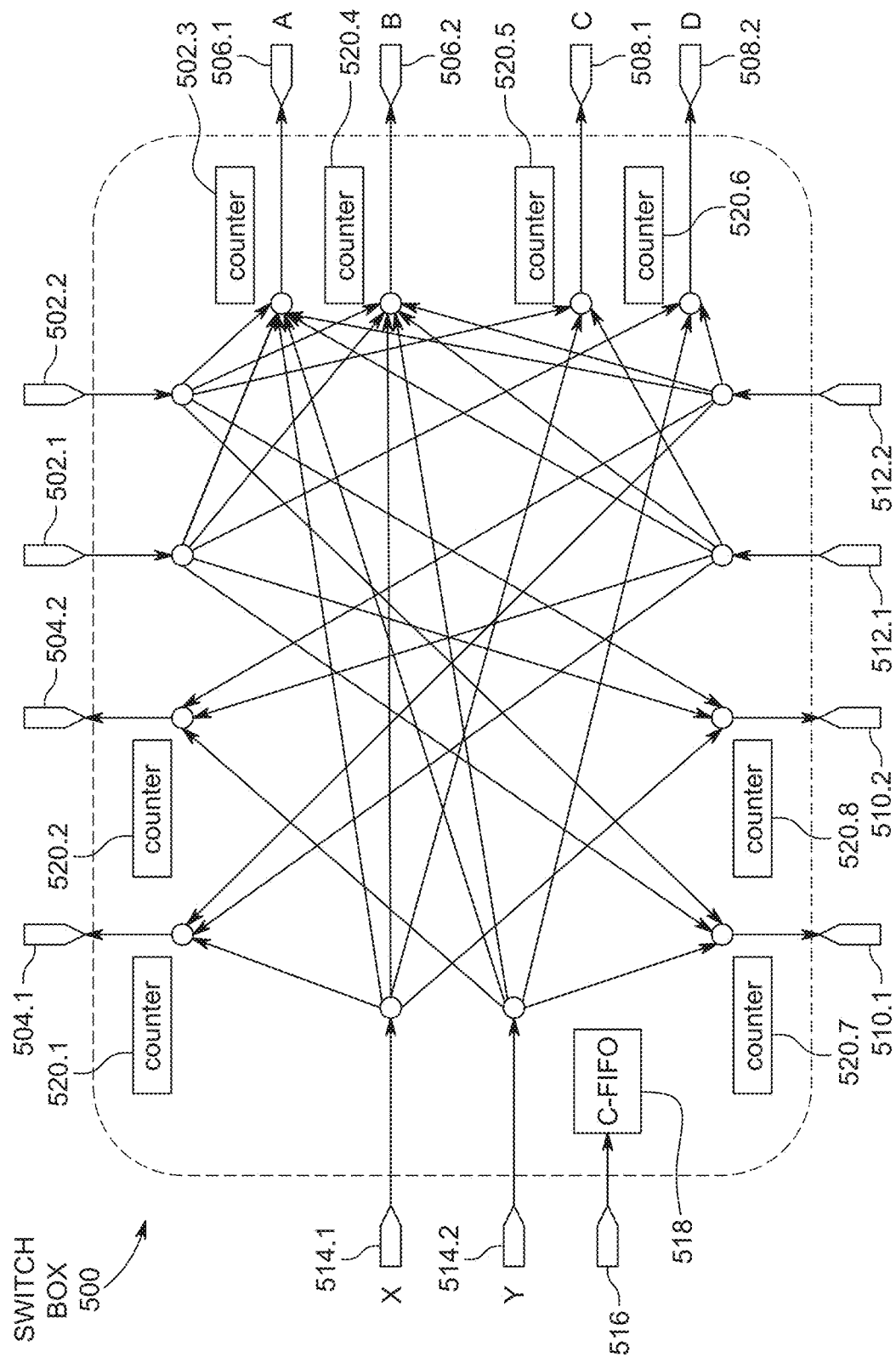
FIG. 5 schematically shows a switch box for a processor in accordance with an embodiment of the present disclosure.

FIG. 5 schematically shows a switch box (SB) 500 in accordance with an embodiment of the present disclosure. The SB 500 may be an embodiment of a SB 222 and may comprise a plurality of data inputs and data outputs, and inter-connections that couple the data outputs to data inputs for data switching. The data inputs of SB 500 may comprise data inputs 502.1, 502.2, 512.1, 512.2, 514.1 and 514.2. The data outputs of SB 500 may comprise data outputs 504.1, 504.2, 506.1, 506.2, 508.1, 508.2, 510.1 and 510.2. The SB 500 may further comprise a configuration buffer 518 and a corresponding configuration input 516. The configuration buffer 518 may be implemented as a First-In-First-Out buffer and referred to as C-FIFO 518. The configuration input 516 may be coupled externally to the configuration bus that's coupled to the sequencer 206 for the SB 500 to receive configurations from the sequencer 206. The configurations for the SB 500 may be referred to as SB configurations. Moreover, the SB 500 may further comprise a plurality of counters 520.1-520.8 each corresponding to a data output, for example, counter 520.1 for data output 504.1, counter 520.2 for data output 504.2, counter 520.3 for data output 506.1, counter 520.4 for data output 506.2, counter 520.5 for data output 508.1, counter 520.6 for data output 508.2, counter 520.7 for data output 510.1, and counter 520.8 for data output 510.2.

Each data input of the SB 500 may be coupled to some data outputs. For example, the data input 502.1 may be coupled to the data outputs 506.1, 506.2, 508.2, 510.1 and 510.2; the data input 502.2 may be coupled to the data outputs 506.1, 506.2, 508.1, 510.1 and 510.2; the data input 512.1 may be coupled to the data outputs 504.1, 504.2, 506.1, 506.2, and 508.1; the data input 512.2 may be coupled to the data outputs 504.1, 504.2, 506.1, 506.2, and 508.2; the data input 514.1 may be coupled to the data outputs 504.1, 506.1, 506.2, 508.1, and 510.2; and the data input 514.1 may be coupled to the data outputs 504.2, 506.1, 506.2, 508.2, and 510.1.

Externally, depending on the location of the SB 500 in the PE array 214, the data inputs 502.1 and 502.2, and data outputs 504.1 and 504.2 may be coupled to a MP 220, or another SB 222 (e.g., in a multi-row PE array). The data inputs 514.1 and 514.2 may be coupled to a PE 218 or the gasket memory 216. The data inputs 512.1 and 512.2, and data outputs 510.1 and 510.2 may be coupled to another SB 222 (e.g., in a multi-row PE array) or an ICSB 224. The data outputs 506.1, 506.2, 508.1 and 508.2 may be coupled to a PE 218. Data signals output from the data outputs 506.1, 506.2, 508.1 and 508.2 may be denoted as A, B, C, D, and data signals input from the data inputs 514.1 and 514.2 may be denoted as X, Y. These data signals A, B, C, D, and X, Y may be the input data signals to a PE 218 and output data signals from a PE 218 as described herein.

Each of the counters 520.1-520.8 at the data outputs may be independently responsible for counting data passed. When one or more configurations may be loaded into the C-FIFO 518, each configuration may specify a number of counts. During execution of one configuration, all counters may independently count how many times data has passed through. When all the counters reach the number of counts specified in the configuration, a next configuration may be applied. A similar approach may be applied inside an ICSB 224, a PE 218, the gasket memory 216 and a memory port 220. Because these counters may facilitate configuration and reconfiguration of each component that may have a such counter, these counters may be referred to as reconfiguration counters and a component that has such a counter may be referred to as a reconfigurable unit. An embodiment of a processor 200 may provide massive parallel data processing using the various reconfigurable units and may be referred to as a reconfigurable parallel processor (RPP).

Figure 6A:
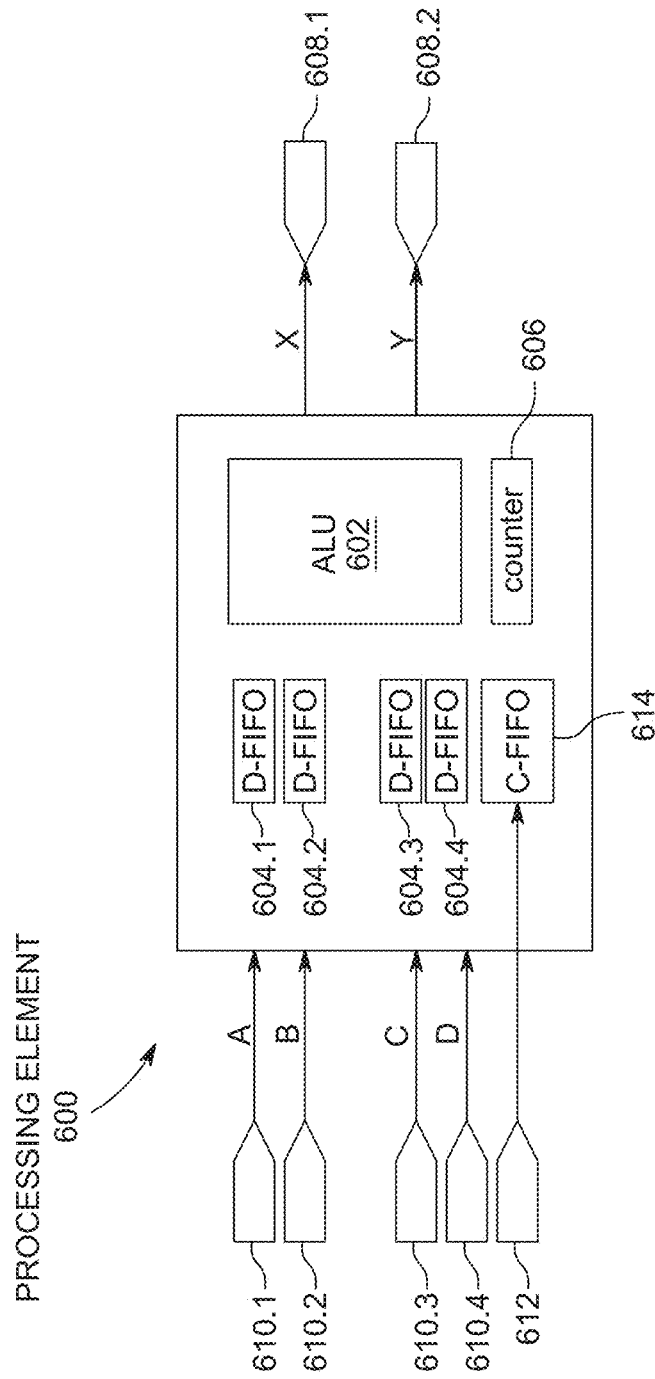
FIG. 6A schematically shows a processing element for a processor in accordance with an embodiment of the present disclosure.

FIG. 6 schematically shows a processing element (PE) 600 in accordance with an embodiment of the present disclosure. The PE 600 may be an embodiment of a PE 218. The PE 600 may comprise an arithmetic logic unit (ALU) 602, a plurality of data buffers (e.g., D-FIFO 604.1, 604.2, 604.3 and 604.4), a counter 606, a plurality of data outputs (e.g., 608.1 and 608.2), a plurality of data inputs (e.g., 610.1, 610.2, 610.3 and 610.4), a configuration input 612 and a configuration buffer (e.g., C-FIFO) 614). In one embodiment, the ALU 602 may be one ALU (e.g., one ALU that is configured to process one piece of data at a time and may be referred as a scalar ALU). In some other embodiments, the ALU 602 may be a vector of ALUs (or referred to as a vector ALU), for example, N ALUs (with N may be referred as the vector size of ALU), and Same Instruction Multiple Data (SIMD) operation may be applied to all ALUs of the vector. Please note that a scalar ALU may be a special case of a vector ALU with a vector size being one.

Data signals received from the data inputs 610.1, 610.2, 610.3 and 610.4 may be denoted as A, B, C, D, and data signals output from the data outputs 608.1 and 608.2 may be denoted as X, Y. In an embodiment in which the ALU 602 may be one ALU, each data input 610.1, 610.2, 610.3 or 610.4 and each data output 608.1 or 608.2 may have a width of M bits that may match the width of the ALU. For example, for an 8-bit ALU, each input and output may be 8-bit; for a 16-bit ALU, each input and output may be 16-bit; for a 32-bit ALU, each input and output may be 32-bit; and so on. And each input data signal A, B, C, D and each output signal X, Y may be M bits. In an embodiment in which the ALU 602 may be a vector of ALUs, each data input 610.1, 610.2, 610.3 or 610.4 may be a vector of N M-bit inputs, and each data output 608.1 or 608.2 may be a vector of N M-bit outputs. And each input data signal A, B, C, D and each output data signal X, Y may be NxM bits.

The data buffers 604.1-604.4 may be coupled to the inputs 610.1, 610.2, 610.3 and 610.4 to temporarily store data pieces. In some embodiments, however, the data buffers may be located as the output. The D-FIFOs 604.1-604.4 may be used to decouple the timing of PEs to allow PEs to work independently. In one embodiment, the buffers may be implemented as FIFOs (e.g., a D-FIFO for a data buffer, a C-FIFO for a configuration buffer).

The configuration buffer C-FIFO 614 may receive configurations from the configuration input 612, which may be coupled externally to the sequencer 206 via the configuration bus, and store the received configurations before any execution of a data path starts. The configurations for the PE 600 may be referred to as PE configurations. The PE 600 may be statically programmed with instructions for one configuration, e.g., the instructions may be programmed to the PE 600 as a stage of pipeline. No instructions may be changed during one configuration. Once configured, the operation of the ALU 602 (e.g., one ALU or vector of ALUs depending on a particular embodiment) may be triggered if D-FIFOs 610.1, 610.2, 610.3 and 610.4 have data and output ports 608.1 and 608.2 are not busy. One of the configuration parameter may be a number for a specified number of executions for an instruction. The counter 606 may be programmed with the specified number and used to count the number of times data has been processed by executing an instruction. When the number of executions has reached the specified number, a new configuration may be applied. Therefore, reconfiguration capability may be provided in each PE. In one embodiment, the specified number of execution for an instruction may be referred to as NUM_EXEC and this NUM_EXEC may be used across a data path for one configuration.

In one embodiment with a multi-row PE array 214, the PEs within each column may be functionally different from each other but the PEs along each row follow a repetitive pattern (e.g., functionally duplicative). For example, ALUs in a first row of PEs may implement a first set of instructions and ALUs in a second row of PEs may implement a second set of instructions that may be different from the first set. That is, ALU 602 in different embodiments of the PE 600 may comprise different structures or different functional components. In some embodiments, one or more rows of PEs of a processor may comprise ALUs that may be relatively simple and use less space and another row of PEs of the same processor may comprise ALUs that may be relatively more complex and use more space. The relatively simple ALUs may implement a set of instructions that may be different from a set of instructions implemented by the relatively more complex ALUs. For example, one embodiment of PE 600 may have an ALU 602 (e.g., one ALU or a vector of ALUs) that implements a set of instructions that require a relatively simple structure, such as, but not limited to, ADDITION (e.g., A+B), SUBSTRACTION (e.g., A−B), etc.; while another embodiment of PE 600 may have an ALU 602 that implements instructions that require a relatively more complex structure, such as, but not limited to, MULTIPLICATION (e.g., A times B (A*B)), MAD (for multiply-accumulate (MAC) operation) (e.g., A*B+C).

Figure 6B:
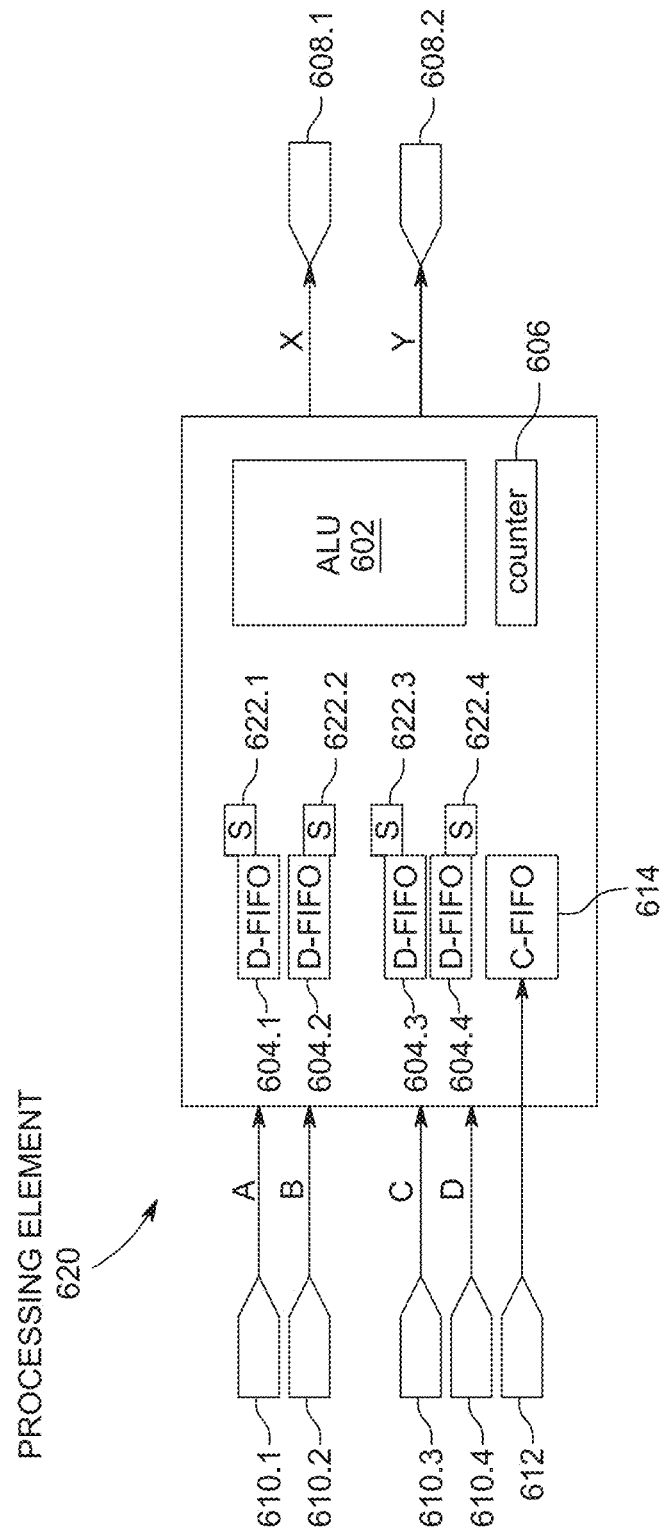
FIG. 6B schematically shows another processing element for a processor in accordance with an embodiment of the present disclosure.

FIG. 6B schematically shows another processing element (PE) 620 in accordance with another embodiment of the present disclosure. The processing element 620 may be alternative embodiment of a PE 218. As shown in FIG. 6B, the PE 620 may have a structure similar to the processing element 600 and differ by having a plurality of indicators "S" 622.1 through 622.4 that each of the indicators may be associated with one respective D-FIFO. For example, the indicator 622.1 may be associated with D-FIFO 604.1, the indicator 622.2 may be associated with D-FIFO 604.2, the indicator 622.3 may be associated with D-FIFO 604.3 and the indicator 622.4 may be associated with D-FIFO 604.4. These indicators may be used for static read configuration (also referred to as static load configuration). For example, during one configuration, an instruction may be set to be executed a specified number of times (e.g., NUM_EXEC=3) by a PE according to the configuration. Executing the instruction may use data from all four D-FIFOs 604.1 through 604.4. The indicator 622.2 may be set while other indicators 622.1, 622.3 and 622.4 may not be set. The data in the D-FIFO 604.2 may be re-used while the instruction is repeated, but new data in the D-FIFOs 604.1, 604.3 and 604.4 may be used for each repetition of the instruction.

Figure 7:
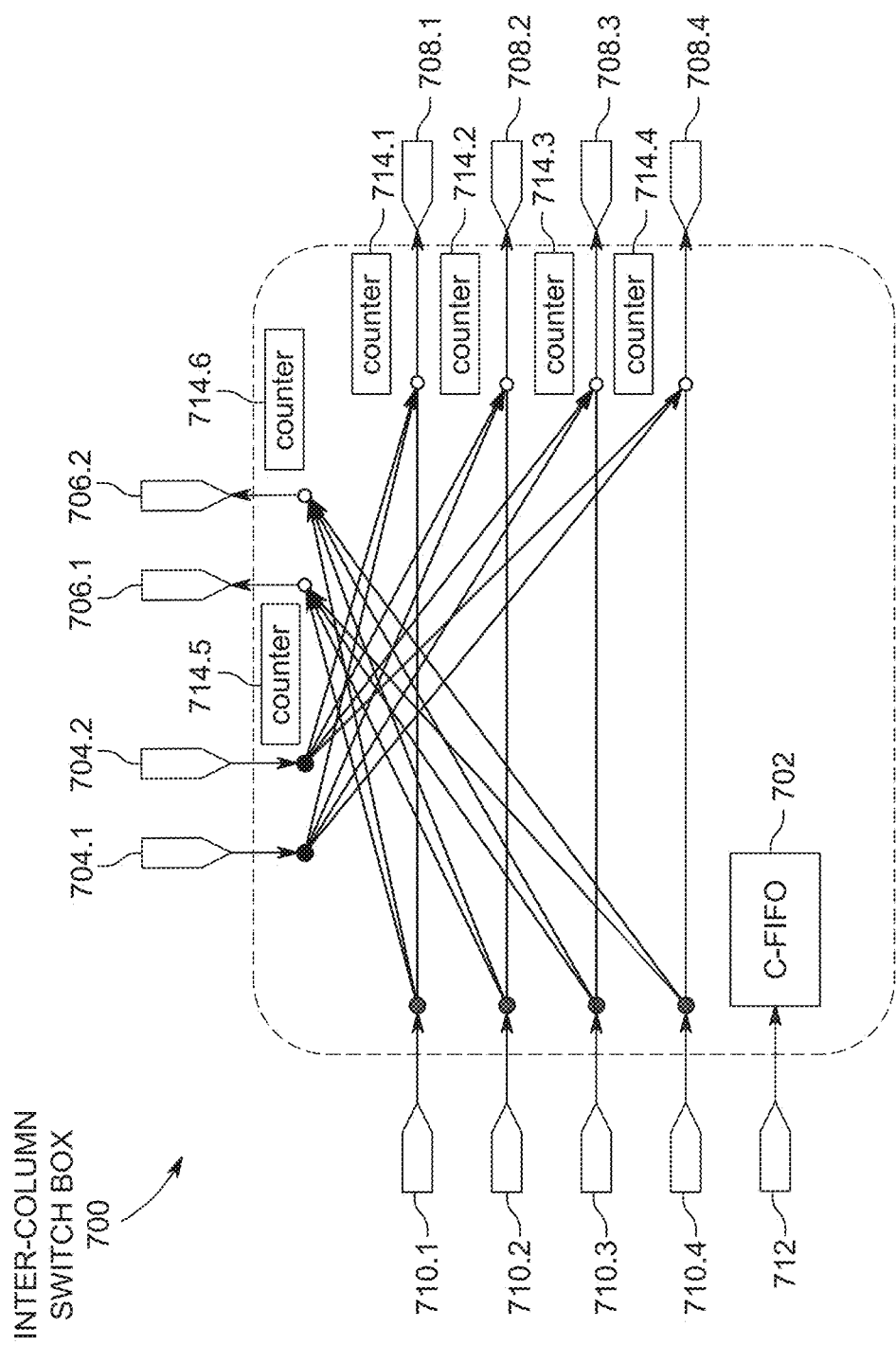
FIG. 7 schematically shows an inter-column switch box for a processor in accordance with an embodiment of the present disclosure.

FIG. 7 schematically shows an inter-column switch box (ICSB) 700 in accordance with an embodiment of the present disclosure. The ICSB 700 may be an embodiment of an ICSB 224 and may comprise a plurality of data inputs and data outputs, and inter-connections that couple the data outputs to data inputs for data switching. The data inputs of ICSB 700 may comprise data inputs 704.1, 704.2, and 710.1-710.4. The data outputs of ICSB 700 may comprise data outputs 706.1, 706.2, and 708.1-708.4. The ICSB 700 may further comprise a configuration buffer 702 and a corresponding configuration input 712. The configuration buffer 702 may be implemented as a First-In-First-Out buffer and referred to as C-FIFO 702. The configuration input 712 may be coupled externally to the configuration bus that's coupled to the sequencer 206. Moreover, the ICSB 700 may further comprise a plurality of counters 714.1-714.6 each corresponding to a data output, for example, counter 714.1 for data output 708.1, counter 714.2 for data output 708.2, counter 714.3 for data output 708.3, counter 714.4 for data output 708.4, counter 714.5 for data output 706.1, and counter 714.6 for data output 706.2.

Each data input of the ICSB 700 may be coupled to some selected data outputs. For example, the data input 704.1 may be coupled to the data outputs 708.1-708.4; the data input 704.2 may be coupled to the data outputs 708.1-708.4; the data input 710.1 may be coupled to the data outputs 706.1-706.2, and 708.1; the data input 710.2 may be coupled to the data outputs 706.1-706.2, and 708.2; the data input 710.3 may be coupled to the data outputs 706.1-706.2, and 708.3; and the data input 710.4 may be coupled to the data outputs 706.1-706.2, and 708.4.

Externally, the data inputs 704.1 and 704.2, and data outputs 706.1 and 706.2 may be coupled to a SB 222. The data inputs 710.1-710.4 may be coupled to a neighboring ICSB 224 or the gasket memory 216. The data outputs 708.1-708.4 may be coupled to another neighboring ICSB 224 or the gasket memory 216.

Each of the counters 714.1-714.6 at the data outputs may be independently responsible for counting data passed. When one or more configurations may be loaded into the C-FIFO 702, each configuration may specify a number of counts. The configurations for the ICSB 700 may be referred to as ICSB configurations. During execution of one configuration of the PE array 214, all counters may independently count how many times data has passed through. When all the counters reach the number of counts specified in the configuration, a next configuration may be applied. This implementation may be similar to what may be applied inside a SB 222, a PE 218, the gasket memory 216 and a memory port 220.

Figure 8:
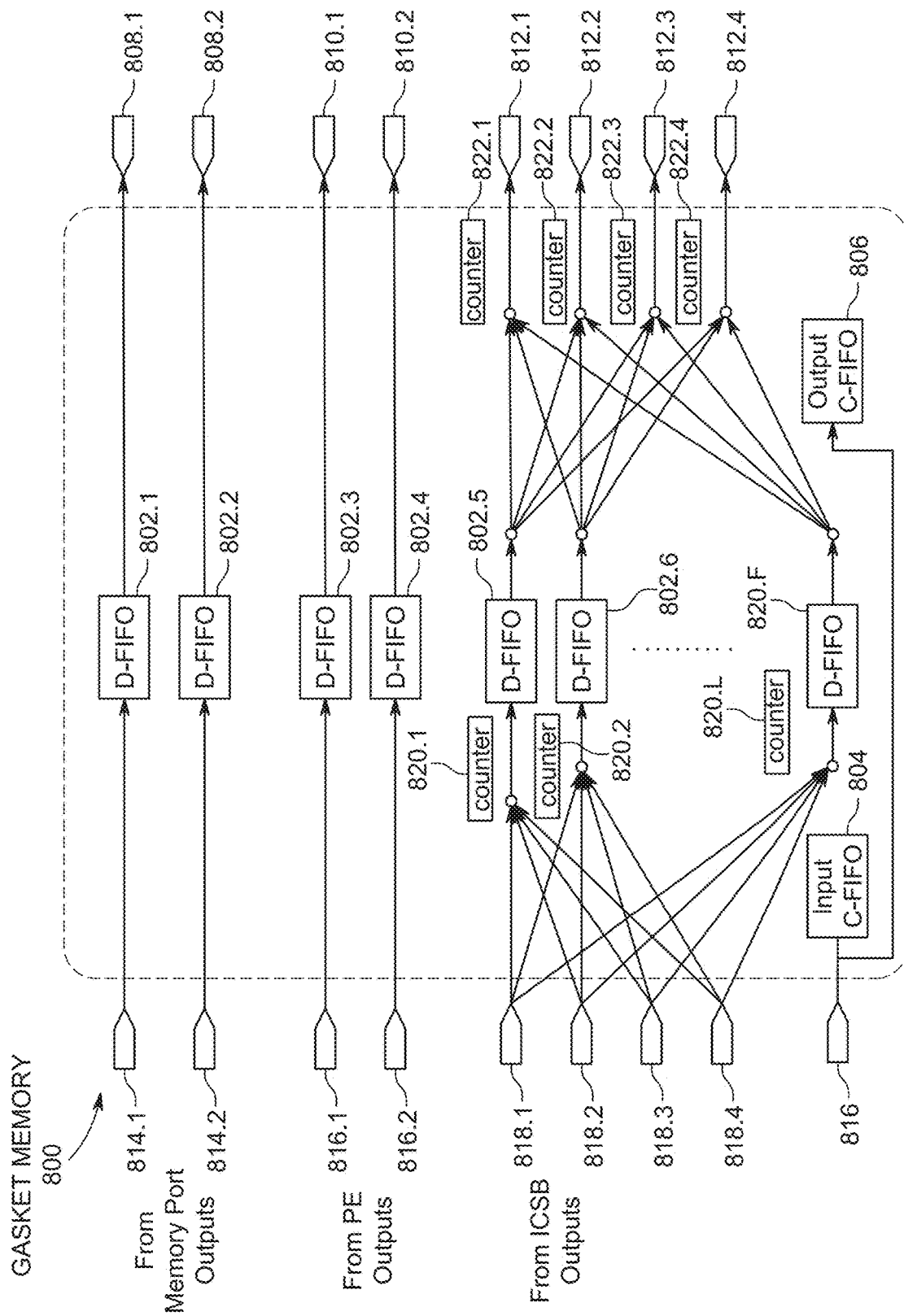
FIG. 8 schematically shows a gasket memory for a processor in accordance with an embodiment of the present disclosure.

FIG. 8 schematically shows a gasket memory 800 in accordance with an embodiment of the present disclosure. The gasket memory 800 may be an embodiment of the gasket memory 216 shown in FIG. 2. The gasket memory 800 may comprise a plurality of data buffers for temporary storage of data. The data buffers may be implemented as First-In-First-Out (FIFO) buffers and referred to as D-FIFOs (e.g., D-FIFO 802.1-802.F, F being an integer equal to or larger than 8). In addition, the gasket memory 800 may comprise a plurality of data inputs (e.g., 814.1-814.2, 816.1-816.2, and 818.1-818.4), a plurality of data outputs (e.g., 808.1-808.2, 810.1-810.2, and 812.1-812.4), an input configuration buffer (e.g., Input C-FIFO 804), an output configuration buffer (e.g., Output C-FIFO 806), a configuration input 816, a plurality of input counters 820.1-820.L (L being an integer equal to or larger than 4), and a plurality of output counters 822.1-822.4.

External connections from the MP 220.N, PE 218.N and ICSB 224.N may be taken as inputs at the data inputs 814.1-814.2, 816.1-816.2, and 818.1-818.4, respectively. And external connections to the MP 220.1, SB 222.1 and ICSB 224.1 may generate outputs at the data outputs 808.1-

808.2, 810.1-810.2, and 812.1-812.4, respectively. The configuration input 816 may be externally coupled to the sequencer 206 via the configuration bus for the gasket memory 800 to receive configurations from the sequencer 206. The configurations for the gasket memory 800 may be referred to as gasket memory configurations. Two types of configurations may be received from the sequencer 206: input configurations and output configurations. The input C-FIFO 804 may store input configurations for input ICSB ports 818.1-818.4 to be coupled to some Data FIFOs selected from L D-FIFOs 802.5-802.F as inputs to these selected D-FIFOs. The output C-FIFO 806 may store configurations for some data FIFOs selected from L D-FIFOs 802.5-802.F to be coupled to the ICSB ports 812.1-812.4.

The number of gasket D-FIFOs 802.5 through 802.F storing ICSB inputs may be greater or equal to the number of input or output ICSB ports. In some embodiments, as described herein, there may be a data connection that may bypass at least a portion of a physical data path. For example, an execution result generated by one PE 218 may not be needed by another PE 218 in the same physical data path configuration but may be used in a future configuration. These data signals for the execution result may be routed via a SB 222 and an ICSB 224 to the gasket memory 216 and stored in the D-FIFOs of the gasket memory 216 for the future configuration. Therefore, in some embodiments, the gasket memory 800 may have more D-FIFOs than the number of input or output ports.

Each of the input counters 820.1-820.L at the data inputs and each of the output counters 822.1-822.4 at the data outputs may be independently responsible for counting data passed. When one or more input configurations and output configurations may be loaded into the input C-FIFO 804 and output C-FIFO 806, each configuration may specify a number of counts. During execution of one configuration, all counters may independently count how many times data has passed through. When all the counters reach the number of counts specified in the configuration, a next configuration may be applied.

Figure 9C:
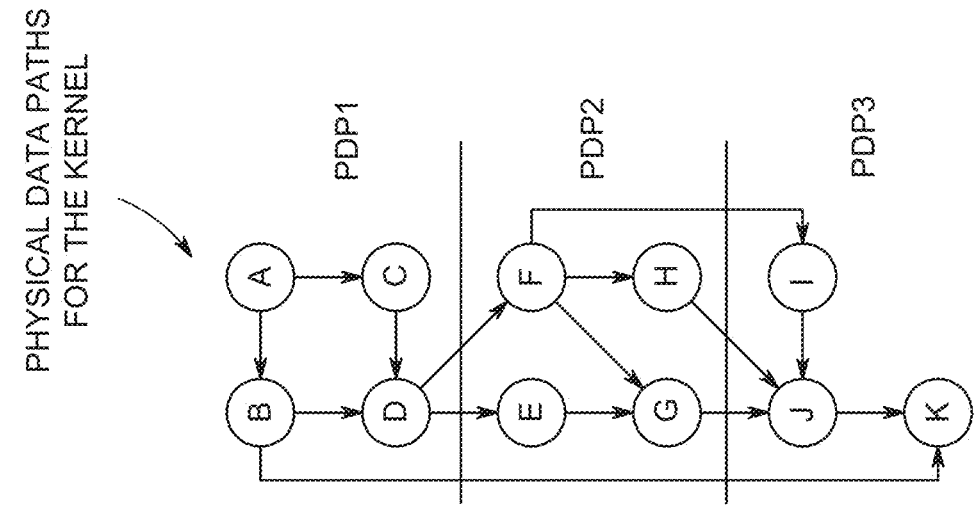
FIG. 9C schematically shows the virtual data path of FIG. 9B divided into physical data paths for a processor in accordance with an embodiment of the present disclosure.
Figure 9B:
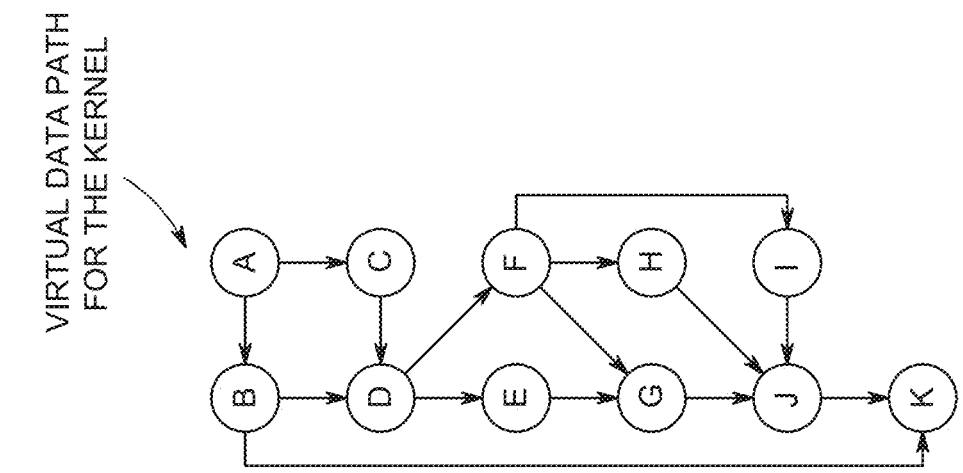
FIG. 9B schematically shows the dependency graph of the execution kernel of FIG. 9A mapped into a virtual data path for a processor in accordance with an embodiment of the present disclosure.
Figure 9A:
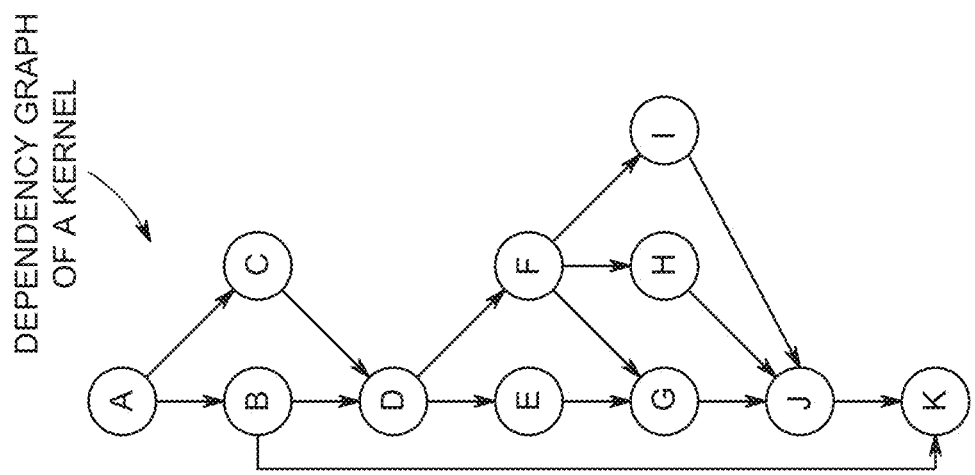
FIG. 9A schematically shows a dependency graph of an execution kernel in accordance with an embodiment of the present disclosure.

FIG. 9A schematically shows an example dependency graph of an execution kernel in accordance with an embodiment of the present disclosure. In one embodiment, a sequence of instructions that may be run in one loop (e.g., one routine or one sub-routine) may be referred to as an execution kernel or simply a kernel. The instructions in the group may have some dependency. For example, the kernel may have instructions denoted as A through K in the dependency graph. Instruction A may be the first instruction in the dependency graph of the kernel. Instructions B and C may need an output from the instruction A. Instruction B's output may be needed by both instructions D and K. Instruction D also may need an output from instruction C. Instruction D's output may be needed by both instructions E and F. Instruction F's output may be needed by instructions G, H and I. In addition to the output from instruction F, instruction G may also need an output from instruction E. Instruction J may need outputs from instructions G, H, I, respectively. And finally, instruction K may need outputs from instructions B and I. The dependency graph of kernel may be mapped to data paths to be executed by a processor in accordance with an embodiment of the present disclosure.

FIG. 9B schematically shows the dependency graph of execution kernel of FIG. 9A mapped into a virtual data path (VDP) for a processor in accordance with an embodiment of the present disclosure. In some embodiments, mapping of a dependency graph of a kernel to a processor may be constrained by multiple factors, for example, size of a PE array, connections between PEs, memory access capability etc. It should be noted that the processor 200 in FIG. 2 schematically illustrates one embodiment of a processor with one row of PEs, but in the embodiment shown in FIG. 9B, the virtual data path for the kernel may be mapped to a processor with two ("2") rows of PEs. In general, a processor in accordance with an embodiment of the present disclosure may utilize a 1-D or 2-D data path (including a processing element (PE) array and interconnections) to process massive parallel data. Each data path may be segmented into sections. In a 1-D data path, a section may include a memory port, a switch box, a PE and an ICSB in one column; and in a 2-D data path, a section may include a memory port, two or more switch boxes, two or more PEs and an ICSB in one column. The data path may be made identical in each section. This allows the dependency graph of the kernel to be mapped to a virtual data path which may include as many repetition as needed (e.g., unlimited or even theoretically infinite) of the data path sections in one dimension. For example, instructions of a kernel may be mapped to columns of PEs and extended in the row direction repetitively (e.g., loop back from the beginning of the row if needed).

FIG. 9C schematically shows the virtual data path of FIG. 9B divided into physical data paths for a processor in accordance with an embodiment of the present disclosure. In one embodiment, in order to simplify the compiler work, a physical data path (PDP) may be made to have repetitive structure. For example, each column may be identical and each PDP may comprise same amount of repetitive columns. As shown in FIG. 9C, the VDP of FIG. 9B may be divided into three PDPs (e.g., PDP1, PDP2 and PDP3) for a 2×2 PE array and thus, the three PDPs may have the same structure. The 2×2 PE array may be the whole PE array of an embodiment of a RPP, or may be part of a N×N (e.g., N being 32 as an example) PE array of another embodiment of a RPP. There may be many connections between PEs in one PDP (e.g., A to B and C, B to D, C to D, etc.), between two consecutive PDPs (e.g., D to E and F, G to J, H to J, F to I, etc.) and between non-consecutive PDPs (e.g., B to K). Within one PDP, all PEs in the PE array may be applied a configuration for the current PDP, and data from one instruction may flow to another instruction directly according to the dependency. For example, a PE may be configured to execute instruction A in PDP1 and data from this PE may directly flow from this PE to the PEs configured to execute instructions B and C. Between PDPs, data from one PDP may flow into a gasket memory for temporal storage. The data may flow out from the gasket memory as input to the next physical data path in a new configuration. For example, a PE may be configured to execute instruction B in PDP1 in one configuration, and data from this PE may be stored to a gasket memory and used as input for a PE configured to execute instruction K in PDP3 in a future configuration.

Figure 10:
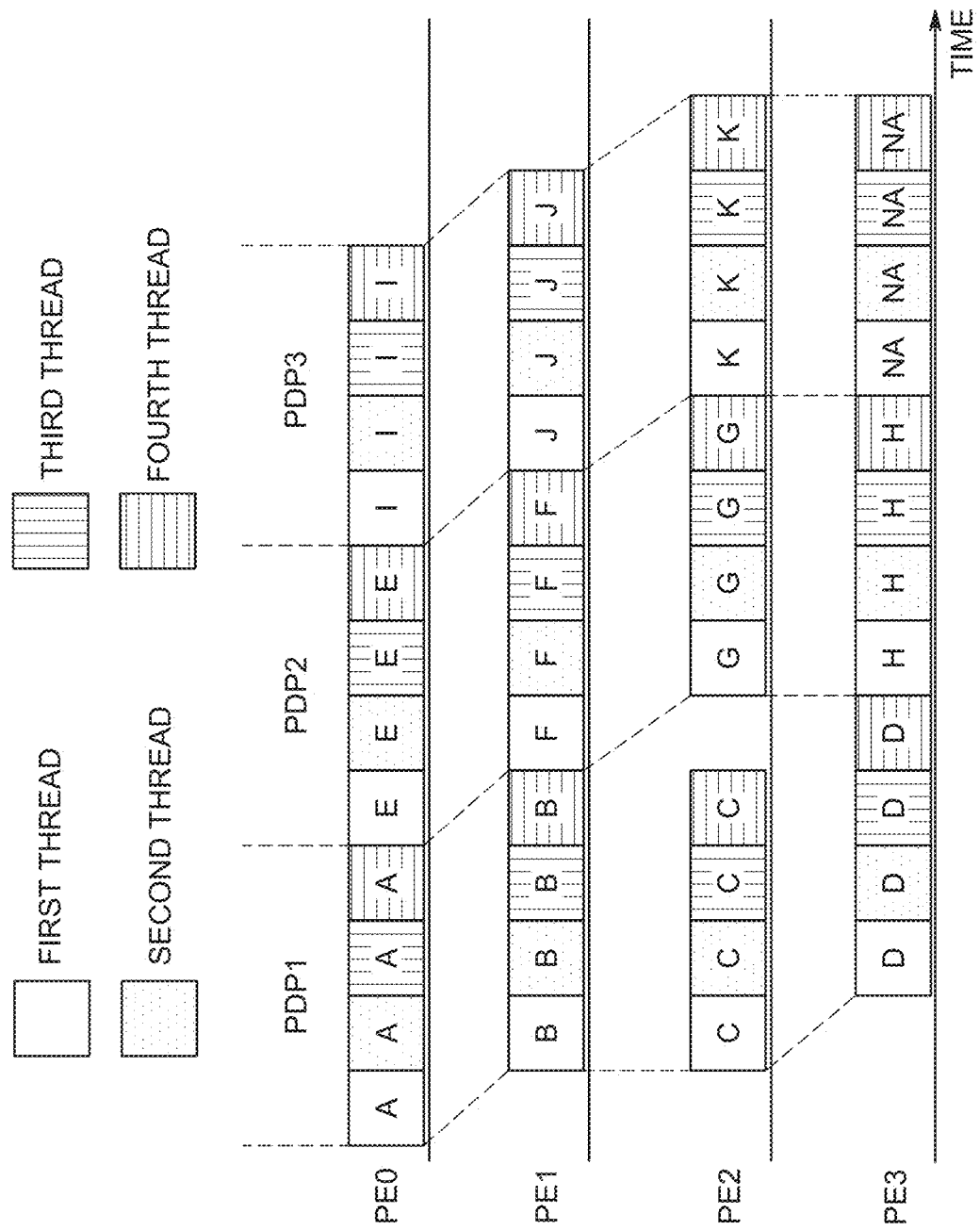
FIG. 10 schematically shows a pipeline operation for a processor in accordance with an embodiment of the present disclosure.

FIG. 10 schematically shows a pipeline operation for a processor in accordance with an embodiment of the present disclosure. The example of pipeline operation shown in FIG. 10 may be the physical data paths of FIG. 9C mapped to a 2×2 PE array of four PEs: PE0, PE1, PE2 and PE3. The instructions of A, B, C, . . . K of the virtual data path may be chopped into PDPs: PDP1, PDP2 and PDP3 as shown in FIG. 9C. PE0 may be configured to execute instruction A in PDP1, instruction E in PDP2 and instruction I in PDP3. PE1 may be configured to execute instruction B in PDP1, instruction F in PDP2 and instruction J in PDP3. PE2 may be configured to execute instruction C in PDP1, instruction G in PDP2 and instruction K in PDP3. PE3 may be configured to execute instruction D in PDP1, instruction H in PDP2 and no instruction in PDP3.

During operation, all concurrent threads in one PE may execute the same instruction and each instruction may be executed multiple times in one PE as a pipeline stage. That is, each PE may be configured to execute an instruction NUM_EXEC times as a pipeline stage. For example, in an embodiment that each PE may comprise a ALU vector with a vector size of one, each instruction may be configured to execute 4 times by the ALU vector at each PE. The 4 times of execution may be represented by four threads processed with each thread in a different shade. For example, in PDP1, PE0 may be configured to execute instruction A four times, PE1 may be configured to execute instruction B four times, PE2 may be configured to execute instruction C four times and PE3 may be configured to execute instruction D four times. In PDP2, PE0 may be configured to execute instruction E four times, PE1 may be configured to execute instruction F four times, PE2 may be configured to execute instruction G four times and PE3 may be configured to execute instruction H four times. In PDP3, PE0 may be configured to execute instruction I four times, PE1 may be configured to execute instruction J four times, PE2 may be configured to execute instruction K four times and PE3 may have no instruction configured. In this embodiment, because there may be data dependency between different instructions, a thread executing an instruction that depends on another instruction may be executed later in time. For example, instruction B may depend on data from instruction A's execution result and therefore, the first thread executing instruction B may follow the first thread executing instruction A in a later cycle, the second thread executing instruction B may follow the second thread executing instruction A in a later cycle, the third thread executing instruction B may follow the third thread executing instruction A in a later cycle, and the fourth thread executing instruction B may follow the fourth thread executing instruction A in a later cycle. Due to static reconfiguration scheme and dependency of the instructions, there could be some time lost during DPD reconfiguration, e.g., PE2 may have one idle cycle during PDP1 to PDP2 transition. In an embodiment in which each PE has a vector ALU with the vector size N larger than 1, each PE may execute N concurrent threads at a time, and each shaded thread in FIG. 10 may represent N concurrent threads.

In various embodiments, the gasket memory may provide a way to reduce the efficiency loss during reconfiguration. For example, even there may be some idle slots during reconfiguration (e.g., reconfiguration of PE2 between instruction C of PDP1 and instruction G in PDP2), if a larger number of thread are used, the idle slots may be insignificant compared to the total busy cycles.

FIG. 11A-11I schematically show a configuration process for a processor in accordance with an embodiment of the present disclosure. The configuration process may illustrate a data path (DP) configuration and reconfiguration. The Sequencer unit (SEQ) 1102 may be an embodiment of the sequencer 206 and may be responsible to schedule the instructions/configurations for each PE (e.g. PE_0 1104, PE_1 1106, and PE_2 1108), and switch box (SB) (e.g., SB_1 1110, SB_2 1112, ICSB_1 1114 and ICSB_2 1116). Each of PEs 1104, 1106 and 1108 may be an embodiment of a PE 218. Each of the SBs 1110 and 1112 may be an embodiment of a SB 222. Each of the ICSBs 1114 and 1116 may be an embodiment of an ICSB 224. Each of the PEs and SBs (including the SBs and ICSBs) of FIG. 11A may be coupled to the SEQ 1102 via a configuration bus (shown as the dotted lines from the SEQ 1102). In this example, a Virtual Data Path (VDP) of an execution kernel may be mapped into two Physical Data Paths (PDPs). It should be noted that this example kernel may be different from the data path examples shown in FIGS. 9A-9C and FIG. 10. The PEs may be denoted with an underline in front of a numeral, such as PE_0, PE_1 and PE_2 in FIGS. 11A-11I to distinguish the example PE0, PE1, PE2, and PE3 in FIG. 10.

In the example configuration process in FIGS. 11A-11I, the first PDP (e.g., which may be referred to as PDP_1 with an underline in front of a numeral to distinguish from the data path example of FIG. 9C) may use the data routing PE_0→PE_1, PE_1→PE_2, and the second PDP (e.g., which may be referred to as PDP_2 to distinguish from the data path example of FIG. 9C) may use a different routing PE_0→PE_1, (PE_0, PE_1)→PE_2. That is, in the first PDP, PE_1 may rely on PE_0's output for its operation, PE_2 may rely on PE_1's output for its operation; and in the second PDP, the PE_1 may rely on PE_0's output for its operation, PE_2 may rely on both PE_1's output and PE_0's output for its operation.

FIG. 11A illustrates that, initially, the entire DP is not configured yet. All PEs may be in a default status. In one embodiment, this default status may be implemented by a default operation instruction, called STALL. Although PEs may be programmed STALL, their respective input data FIFOs may be empty and ready to receive data. The busy signals, however, may be set to be 0. Therefore, all the SBs may be stalled and no signal may be routed. For example, all data connections between the components may be shown in dotted lines to indicate that no data may pass through (e.g., the data connections between PE_0 1104 and SB— 1110, between SB_1 1110 and ICSB_1 1114, between SB_1 1110 and PE_1 1106, between PE_1 1106 and SB_2 1112, between SB_2 1112 and ICSB_2 1116, and between SB_2 1112 and PE_2 1108).

FIG. 11B illustrates that the SEQ 1102 may start to load the first instruction INS1 into PE_0 1104, but SB_1 1110 and ICSB_1 1114 may still be stalled. For example, the configuration connection from SEQ 1102 to PE_0 1104 may be open and illustrated as dashed lines, in contrast, the other configuration connections may be closed and shown in dotted lines. Because INST1 may be the first instruction in this execution kernel and not dependent on any other conditions, PE_0 1104 may be ready to generate outputs but blocked by the output busy signal from SB_1 1110. At this stage, no data may pass through any data connections between the components and the data connections may be shown in dotted lines.

Figure 11C:
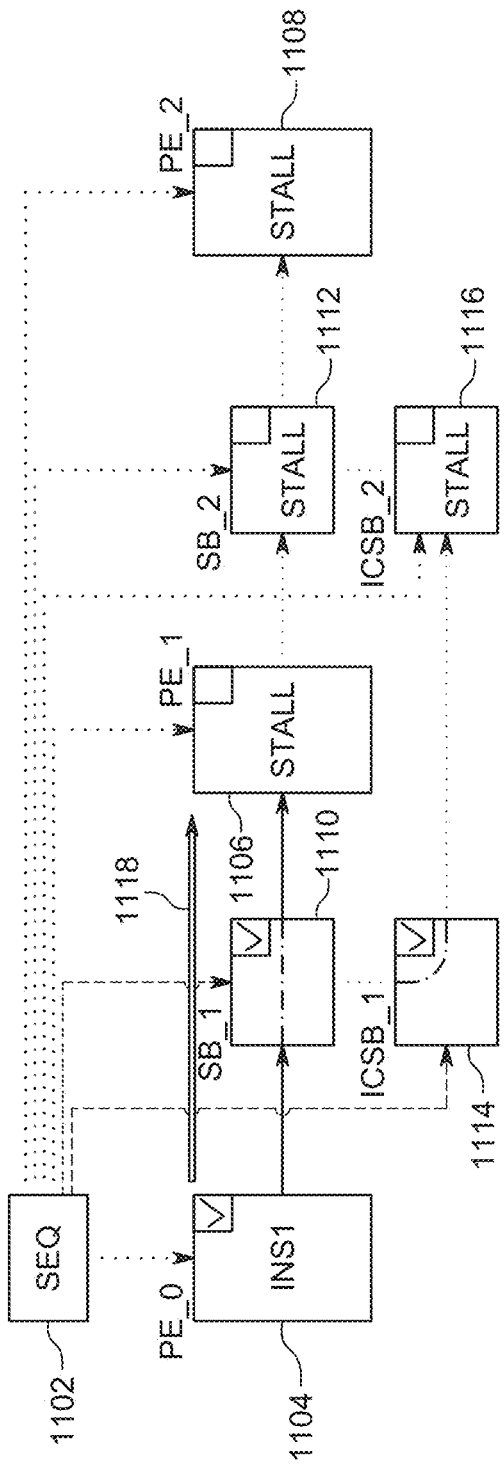

As shown in FIG. 11C, at this stage, the SEQ 1102 may have programmed both SB_1 1110 and ICSB_1 1114, and the data route from PE_0→PE_1 may be opened. For example, the configuration connection from SEQ 1102 to SB_1 1110 and ICSB_1 1114 may be open and illustrated as dashed lines, in contrast, the other configuration connections may be closed and shown in dotted lines. PE_0 1104 may generate outputs and these outputs may be routed via SB_1 1110 (e.g., a dash dotted line inside the SB_1 1110 to show internal connection open) to PE_1 1106. PE_1 1106 may receive the outputs from PE_0 1104 and store these data signals in its data buffer (e.g., D-FIFOs) even when PE_1 1106 has not been configured yet. The data connections between PE_0 1104 and SB_1 1110 and between SB_1 1110 and PE_1 1106 may be shown in solid lines to indicate data may pass through. A double-lined arrow 1118 may illustrate this data flow.

Because the output from PE_0 1104 may only be needed by PE_1 1106 in the first PDP, at this moment, no data may need to pass through ICSB_1 1114. Thus, although ICSB_1 1114's configuration may be programed already (e.g., it's internal connection shown in a dash dotted line), but there is no data coming to ICSB_1 1114 (e.g., its connection to SB_1 1110 in a dotted line) and ICSB_1 1114 may stay still.

Figure 11D:
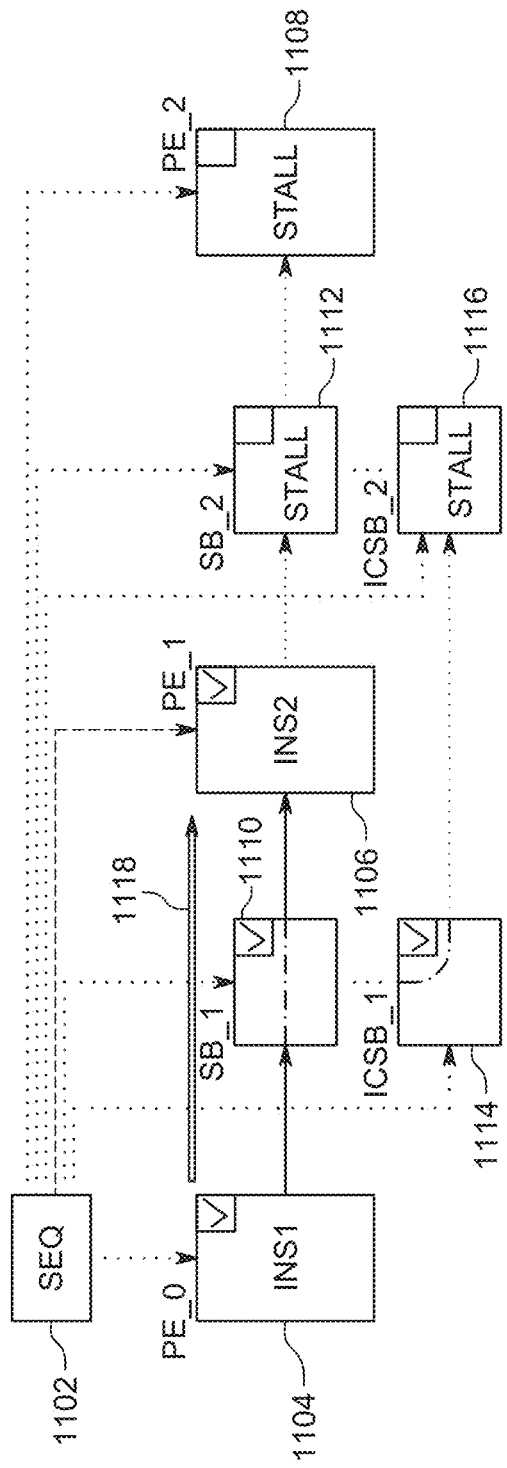

At the stage shown in FIG. 11D, the configuration connection from SEQ 1102 to PE_1 1106 may be open and illustrated as dashed lines. In contrast, the other configuration connections may be closed and shown in dotted lines. SEQ 1102 may now configure a second instruction INS2 to PE_1 1106, and PE_1 1106 may be ready to execute and generate outputs but blocked by the output busy signal from SB_2 1112. At the same time, the data generated from PE_0 1104 may continuously be sent to D-FIFO of PE_1 1106. At this stage, all data connections between the components may be the same as in FIG. 11C.

Figure 11E:
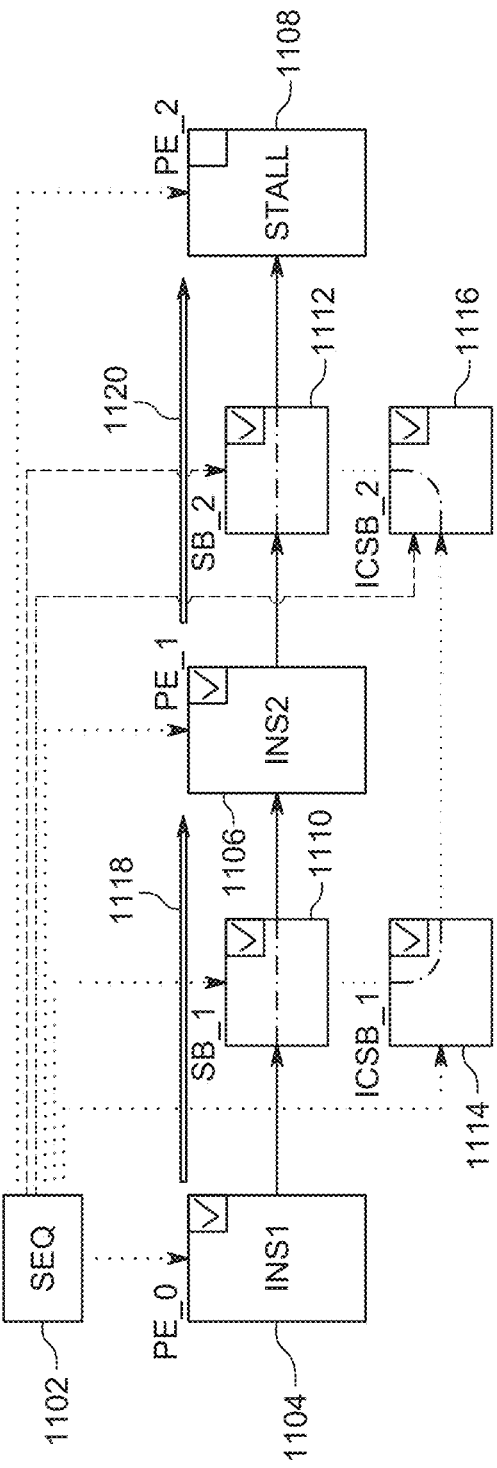

In FIG. 11E, at this stage, the configuration connection from SEQ 1102 to SB_2 1112 and ICSB 1116 may be open and illustrated as dashed lines. In contrast, the other configuration connections may be closed and shown in dotted lines. When SB_2 1112 may be configured and open, PE_1 1106 may start executing INS2 and generate outputs. These outputs may be routed via SB_2 1112 (e.g., a dash dotted line inside the SB_2 1112 to show internal connection open) to PE_2 1108. PE_2 1108 may receive the outputs from PE_1 1106 and store these data signals in its data buffer (e.g., D-FIFOs) even when PE_2 1108 has not been configured yet. The data connections between PE_1 1106 and SB_2 1112 and between SB_2 1112 and PE_2 1108 may be shown in solid lines to indicate data may pass through. A double-lined arrow 1120 may illustrate this data flow.

Because in the first PDP, the input to PE_2 1108 may only come from PE_1 1106, at this moment, no data may need to pass through ICSB_2 1116. Thus, although ICSB_1 1116's configuration may be programed already (e.g., it's internal connection shown in a dash dotted line), but there is no data passing through ICSB_2 1116 (e.g., its connection to SB_2 1112 shown in a dotted line) and ICSB_2 1116 may stay still.

Figure 11F:
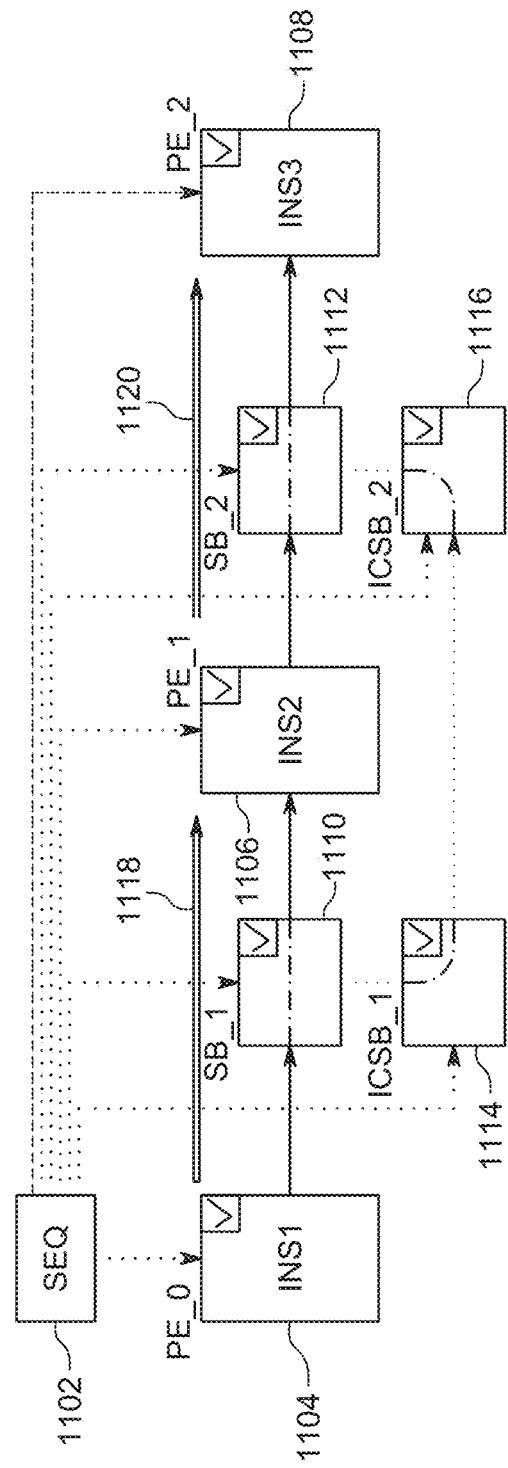

At the stage shown in FIG. 11F, the configuration connection from SEQ 1102 to PE_2 1108 may be open and illustrated as dashed lines. In contrast, the other configuration connections may be closed and shown in dotted lines. And the last instruction INS3 of the first PDP may be programmed to PE_2 1108. Although not shown, at this stage, the configuration connection to a gasket memory (e.g., an embodiment of the gasket memory 216) may also be opened, and the data connection of the gasket memory may also be programmed. Now PE_2 1108 may execute INS3 and result may be stored into the gasket memory. In one embodiment, by now, the entire PDP_1 configuration may be completed and each PE (e.g., PE_0 1104, PE_1 1106 and PE_2 1108) may independently execute the respective instructions a specified number (e.g., NUM_EXEC) of times. Each SB (e.g., SB_1 1110 and SB_2 1112) and each ICSB (e.g., ICSB_1 1114 and ICSB_2 1116) may also execute their respective configurations the specified number (e.g., NUM_EXEC) times for PDP_1.

In some embodiments, configurations for PDPs of a VDP (e.g., for a dependency graph of an execution kernel) may be sent to the components independently while each component may be operating according to a current configuration. For example, while the PEs (e.g., PE_0 1104, PE_1 1106 and PE_2 1108), SBs (e.g., SB_1 1110 and SB_2 1112) and ICSBs (e.g., ICSB_1 1114 and ICSB_2 1116) may be operating under their respective first configuration for PDP_1, subsequent configurations of other PDPs of the same VDP for each of these components may be received from the SEQ 1102. In one embodiment, a plurality of configurations for one component may be sent via the configuration bus from a sequencer 206 in a batch as long as sending multiple configurations for one component will not slow down or block the operation of any other components.

Therefore, while PDP_1 may be carried out, all the configurations for PDP_2 may have been received by the components. As shown in FIG. 11G, at this stage, by the time when all threads (e.g., all ALUs in an ALU vector 602) on PE_0 1104 have completed PDP_1, PE_0 1104 may be reconfigured to a fourth instruction INS4. For example, PE_0 1104 may reconfigure by itself by applying the PDP_2 configuration already in its configuration buffer C-FIFO 614. Similarly, SB_1 1110 may also be reconfigured once the last data from INS1 has passed it. The first output data from INS4 may be delivered to ICSB_1 1114 due to the new PDP_2 configuration on SB_1 1110 (e.g., a new dash dotted line connecting to ICSB_1 1114). The data signal to ICSB_1 1114 may be blocked, however, by a busy signal from ICSB_2 1116 because ICSB_2 1116 may have not been reconfigured yet.

At the stage shown in FIG. 11H the PE_1 1106, SB_2 1112, ICSB_2 1116 may have reached the specified number of executions in PDP_1, and may be reconfigured. For example, PE_1 1106 may be reconfigured to a fifth instruction INS5, and SB_2 1112 and ICSB_2 1116 may also be reconfigured so that the data from PE_0 1104 may also reach the D-FIFO of PE_2 1108 via ICSB_1 1114. A new dash dotted line inside SB_2 1112 may be shown to connect ICSB_2 1116 to PE_2 1108 via SB_2 1112. The data flow from PE_0 1104 to PE_2 1108 may be illustrated by the double-lined arrows 1122 (e.g., from PE_0 1104 to ICSB_1 1114) and 1124 (e.g., from ICSB_1 1114 to PE_2 1108).

Figure 11I:
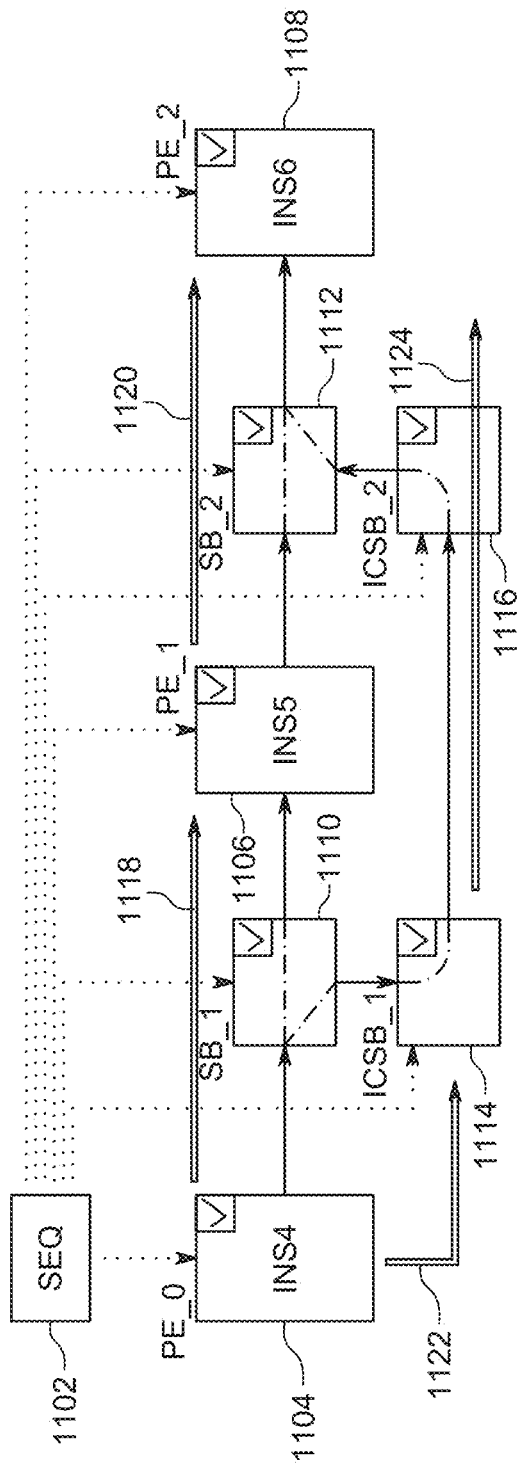

At the stage shown in FIG. 11I at last, PE_2 1108 may reach the specified number of execution for PDP_1 and may be reconfigured to a last instruction INS6 for PDP_2. The entire PDP_2 configuration may be applied to the data path components. The components for PDP_2 configuration may each run a specified number of times for the PDP_2 configuration to complete the entire execution kernel.

Figure 12A:
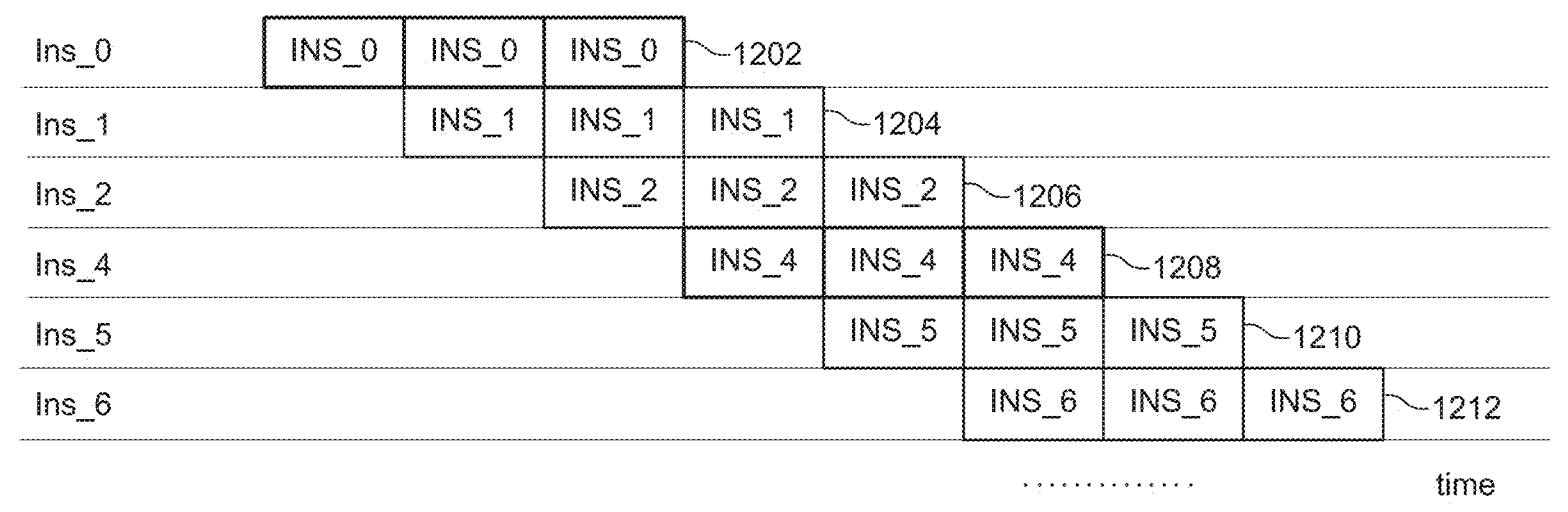

FIG. 12A schematically shows a pipeline operation for executing a stream of instructions using a processor in accordance with an embodiment of the present disclosure. In a shared memory access mode, one memory address may be accessed by all threads executing same instruction. To load data from the same address for all the threads, the pipeline may keep on fetching the same data for all these threads and creates unnecessary traffic in the memory unit. The instructions in this example may be denoted with an underline in front of a numeral to distinguish the example instructions shown in FIGS. 11A-11I. In the example pipelined instruction execution shown in FIG. 12A, instruction Ins_0 may be a data loading instruction "Load x[j]" and a memory port may be configured to execute Ins_0 three times (e.g., NUM_EXEC being 3 for a memory port configured to execute the load instruction) as a pipeline stage 1202. The data piece x[j] may be common to all threads and loaded from the same address. For example, the data piece x[j] may be a j-th data piece in a vector x, and this j-th data piece may be used by all threads. In an embodiment with N ALUs in one PE, there may be N concurrent threads represented by one block (e.g., one block of threads) and the pipeline stage 1202 may be configured to execute Ins_0 3×N times.

Instruction Ins_1 may be a data loading instruction "Load a[k][j]" and a memory port may be configured to execute Ins_1 three times as a pipeline stage 1204. The data piece to be loaded by Ins_1 may be different for different threads and may be loaded from different addresses for different threads. For example, a[k][j] may be a j-th data piece for a k-th thread, with k may be an integer between 0 to N−1 (inclusive) for each thread in the first block of threads, between N to 2N−1 (inclusive) for each thread in the second block of threads, and between 2N to 3N−1 (inclusive) for each thread in the third block of threads.

In one embodiment, the pipeline stages 1202 and 1204 may be performed at a same memory port if the memory port is configured to carry out two data loading instructions in parallel. For example, two parallel read data lines and two parallel write data lines between each of the MPs 220 and the memory unit 212 are shown in FIG. 2. Moreover, the switch box 500 shows how the parallel input data lines may be switched to a PE (e.g., 502.1 and 502.2 switched to 506.1, 506.2, 508.1 or 508.2). In another embodiment, the pipeline stages 1202 and 1204 may be performed at two different memory ports.

Instruction Ins_2 may be a multiplication instruction "y=a[k][j]*x[j]" with the data piece x[j] being loaded by Ins_0 and a[k][j] being loaded by Ins_1 and a PE may be configured to execute Ins_2 three times (e.g., NUM_EXEC being 3 with totally 3×N times for all threads) as a pipeline stage 1206. Therefore, each PE or MP may be configured to execute NUM_EXEC amount of instructions as a pipeline stage.

Instruction Ins_4 may be a data loading instruction "Load x[j+1]" and a memory port may be configured to execute Ins_4 three times as a pipeline stage 1208. The data piece x[j+1] may be common to all threads and loaded from the same address. For example, the data piece x[j+1] may be a j+1-th data piece in the vector x, and this j+1-th data piece may be used by all threads. Instruction Ins_5 may be a data loading instruction "Load a[k][j+1]" and a memory port may be configured to execute Ins_5 three times as a pipeline stage 1210. The data piece to be load by Ins_5 may be different for different threads and may be loaded from different addresses for different threads. For example, a[k][j+1] may be a j+1-th data piece for a k-th thread, with k may be an integer between 0 to N−1 (inclusive) for each thread in the first block of threads, between N to 2N−1 (inclusive) for each thread in the second block of threads, and between 2N to 3N−1 (inclusive) for each thread in the third block of threads. In one embodiment, the pipeline stages 1208 and 1210 may be performed at a same memory port if the memory port is configured to carry out two data loading instructions in parallel. In another embodiment, the pipeline stages 1208 and 1210 may be performed at two different memory ports.

Instruction Ins_6 may be a multiplication instruction "y=a[k][j+1]*x[j+1]" with the data piece x[j+1] being loaded by Ins_4 and a[k][j+1] being loaded by Ins_5 and a PE may be configured to execute Ins_6 three times as a pipeline stage 1212.

Figure 12B:
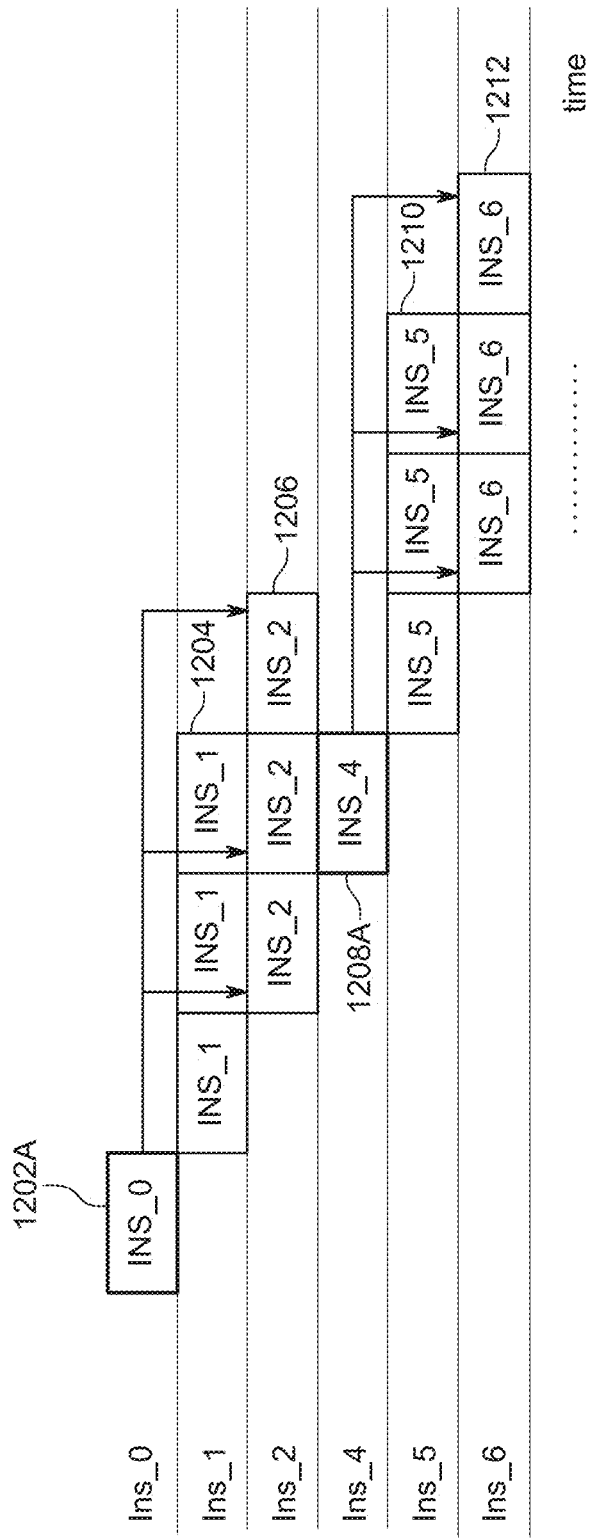
FIG. 12B schematically shows a reduced pipeline operation for executing a stream of instructions using a processor in accordance with an embodiment of the present disclosure.

In the example pipelined instruction execution of FIG. 12A, Ins_0 and Ins_4 may be repeated although many repeated memory reads may not be necessary. FIG. 12B schematically shows a reduced pipeline operation for executing a stream of instructions using a processor in accordance with an embodiment of the present disclosure. In one embodiment, a compiler or other method (e.g., the sequencer) may identify the static read in the sequence of instructions in FIG. 12A and the repeated operations may be reduced to one time. For example, the static load instruction (e.g., Ins_0 and Ins_4) may be programed with NUM_EXEC=1 (e.g., this may be applied to the MP that will perform data fetching). As shown in FIG. 12B, the pipelined stages 1202A and 1208A may be one blocks respectively. In one embodiment, indicators S may be implemented in the PEs and MPs next to PEs' or MPs' D-FIFO (e.g., indicators 622 in a PE 620), and for any PEs and MPs that that receive data from the static load, the indicator S next to PEs' or MPs' D-FIFO that receive data from the static load may be set. For example, the PE configured to execute Ins_2 at pipeline stage 1206 may comprise D-FIFOs that receive data from the MP(s) configured for pipeline stages 1202A and MP 1204 respectively, and an indicator S may be set next to the D-FIFO that receives data from pipeline stage 1202A. Similarly, the PE configured to execute Ins_6 at pipeline stage 1212 may comprise D-FIFOs that receive data from the MP(s) configured for pipeline stages 1208A and 1210 respectively, and an indicator S may be set next to the D-FIFO that receives data from pipeline stage 1208A. With the NUM_EXEC=1, the data load operation in pipeline stages 1202A and 1208A may be executed only once for this configuration. Given the static indication S, the PEs configured to perform pipeline stages 1206 and 1212 may execute its operation three times (e.g., their NUM_EXEC is still equal to 3) but data from the D-FIFO with indication S may be reused for NUM_EXEC times.

In some embodiments, this operation mode with reduced pipeline stage may be generalized to other instructions. In one embodiment, for an instruction that may generate the same result for different threads, the same approach can be used to reduce power consumptions. For example, a result from one PE may be used as an input for different threads in another PE in the same physical data path, or a result from a PE of one physical data path may be used as an input for different threads in a PE in another physical data path, the result may be loaded only once with the indication S set for a corresponding D-FIFO and reused.

Referring to FIG. 13, a flowchart of a process 1300 for executing an execution kernel is depicted in accordance with an embodiment of the present disclosure. At block 1302, an execution kernel may be mapped into a virtual data path at a processor. For example, as shown in FIG. 9B, an execution kernel may be mapped into a virtual data path by an example processor 200. The execution kernel may include a sequence of instructions to be executed by the processor. In one embodiment, the processor may comprise various reconfigurable units that include a gasket memory. Moreover, in one embodiment, the processor may comprise various reconfigurable units that form repetitive columns. At block 1304, the virtual data path may be chopped into one or more physical data paths. For example, as shown in FIG. 9C, a virtual data path may be chopped into three physical data paths. In one embodiment, the various reconfigurable units may form the one or more physical data paths to execute the sequence of instructions. Moreover, in one embodiment, each of the one or more physical data paths may be fitted into the repetitive columns respectively. For example, a first physical data path and a second physical data path may be fitted into the repetitive columns respectively. At block 1306, configurations may be delivered to various reconfigurable units of the processor. The various reconfigurable units may form the one or more physical data paths according to the configurations to execute the sequence of instructions. At block 1308, the processor may be executed to complete the one or more physical data paths by operating the various reconfigurable units according to the configurations. In one embodiment, data from one physical data path may be routed to the gasket memory to be used in a future physical data path as input.

Referring to FIG. 14, a flowchart of a process 1400 for reconfiguring a processor is depicted in accordance with an embodiment of the present disclosure. At block 1402, a plurality of configurations may be delivered to a plurality of reconfigurable units of a processor. The plurality of configurations may be for the plurality of reconfigurable units to form a plurality of physical data paths to execute a sequence of instructions. In one embodiment, each of the plurality of configurations may include a specified number (e.g., the NUM_EXEC number as described herein). At block 1404, a respective operation may be repeated at each of the plurality of reconfigurable units for a specified number of times. For example, the plurality of reconfigurable units may include a first reconfigurable processing element (PE), and the first reconfigurable PE may execute a first instruction of the sequence of instructions the specified number of times in a first physical data path of the plurality of physical data paths. At block 1406, each reconfigurable unit may be reconfigured to a new configuration. In one embodiment, after each reconfigurable unit having repeated its respective operation the specified number of times, each reconfigurable unit may be reconfigured. For example, the first reconfigurable PE may be reconfigured to execute a second instruction of the sequence of instructions the specified number of times according to a second configuration in a second physical data path of the plurality of physical data paths.

Figures 15, 16:
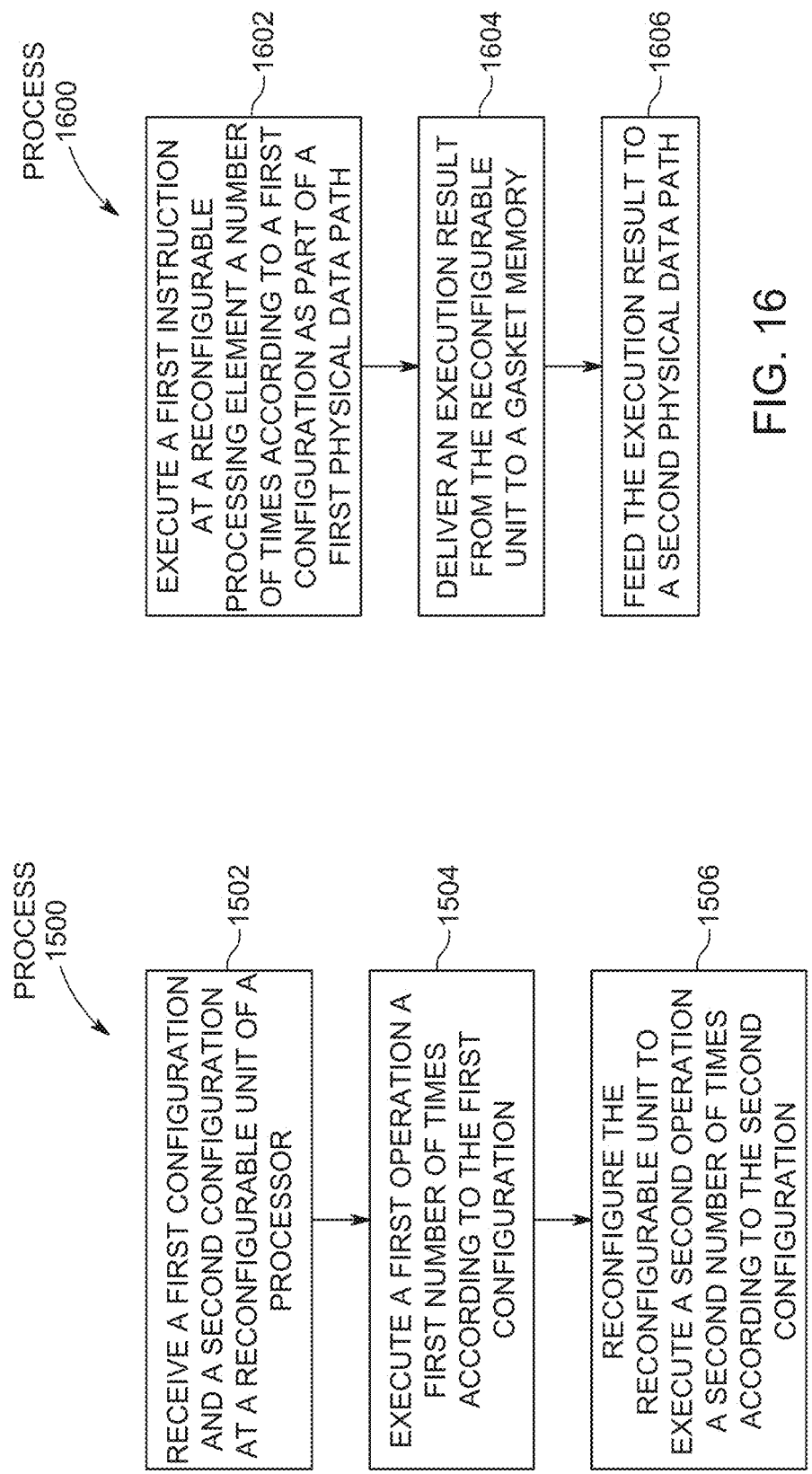
FIG. 15 is a flowchart of another method for reconfiguration in accordance with an embodiment of the present disclosure.
FIG. 16 is a flowchart of another method for reconfiguration in accordance with an embodiment of the present disclosure.

Referring to FIG. 15, a flowchart of a process 1500 for reconfiguring a processor is depicted in accordance with an embodiment of the present disclosure. At block 1502 a first configuration and a second configuration may be received at a reconfigurable unit of a processor. For example, PE_0 1104 in FIGS. 11A-11I may receive a first configuration that may comprise the first instruction INS1 and a second configuration that may comprise the fourth instruction INS4. PE_0 1104 may store these configurations in its configuration buffer (e.g., C-FIFO 614). At block 1504, a first operation may be executed a first number of times according to the first configuration. For example, PE_0 1104 may execute the instruction INS1 a number of times according to the NUM_EXEC in the first configuration. The first configuration may be part of a first physical data path (e.g., PDP_1) for executing a first part of a sequence of instructions. At block 1506, the reconfigurable unit may be reconfigured to execute a second operation a second number of times according to the second configuration. For example, PE_0 1104 may be reconfigured by applying the second configuration to execute the instruction INS4 a number of times according to the NUM_EXEC in the second configuration. The second configuration may be part of a second physical data path (e.g., PDP_2) to execute a second part of the sequence of instructions.

Referring to FIG. 16, a flowchart of process 1600 for reconfiguring a processor is depicted in accordance with an embodiment of the present disclosure. At block 1602, a first instruction may be executed at a reconfigurable processing element a number of times. The execution may be performed according to a first configuration as part of a first physical data path. For example, PE_2 may be configured to execute INS3 NUM_EXEC times according to a configuration as part of PDP_1. At block 1604, an execution result from the reconfigurable unit may be delivered to a gasket memory. For example, the execution result from PE_2 for execution of INS3 may be delivered to a gasket memory. In one embodiment, if the first instruction is to be executed a number of times at the reconfigurable unit, the execution result may be delivered to the gasket memory after each execution of the first instruction. For example, the gasket memory may store the successive execution results in one of its data buffers (e.g., one of D-FIFOs 802.3 through 802.F). At block 1606, the execution result stored in the gasket memory may be fed from the gasket memory to a second physical data path. For example, the execution result from PE_2 executing the instruction INS3 may be used as input for an instruction to be executed by a PE in the second physical data path. The execution result stored in the gasket memory may then be delivered from the gasket memory to that PE for executing the second physical data path.

Figure 17:
FIG. 17 is a flowchart of a method for accessing memory in accordance with an embodiment of the present disclosure.

Referring to FIG. 17, a flowchart of a process 1700 for accessing memory is depicted in accordance with an embodiment of the present disclosure. At block 1702, a plurality of memory addresses for a memory unit may be generated by an address calculation unit in a memory port for parallel threads. For example, the memory port may provide memory access to a memory unit for a processing element (PE) that may have a plurality of arithmetic logic units (ALUs) configured to execute a same instruction in parallel threads. In one embodiment, the memory port may be one of a plurality of memory ports that provide access to a memory unit for a plurality of processing elements (PEs). Each of the plurality of PEs may have a plurality of arithmetic logic units (ALUs) configured to execute a same instruction in parallel threads. At block 1704, a plurality of memory banks in the memory unit may be accessed with each thread accessing a different memory bank. In one embodiment, in a private memory access mode, each thread may access a different memory bank for its data.

Figure 18:
FIG. 18 is a flowchart of another method for accessing memory in accordance with an embodiment of the present disclosure.

Referring to FIG. 18, a flowchart of a process 1800 for accessing memory is depicted in accordance with an embodiment of the present disclosure. At block 1802, a plurality of memory addresses for a memory unit may be generated by an address calculation unit in a memory port for parallel threads. The memory port may provide memory access for a processing element that has a plurality of arithmetic logic units (ALUs) configured to execute a same instruction in parallel threads. In one embodiment, the memory port may be one of a plurality of memory ports that provide access to a memory unit for a plurality of processing elements (PEs) each having a plurality of arithmetic logic units (ALUs) that are configured to execute a same instruction in parallel threads. At block 1804, a plurality of memory banks in the memory unit may be accessed with all threads accessing a common area in the memory unit. In one embodiment, in a shared memory access mode, each of the parallel threads executing by a PE may have access anywhere in the common area. That is, the common area may be a shared memory space for all threads.

Figure 19:
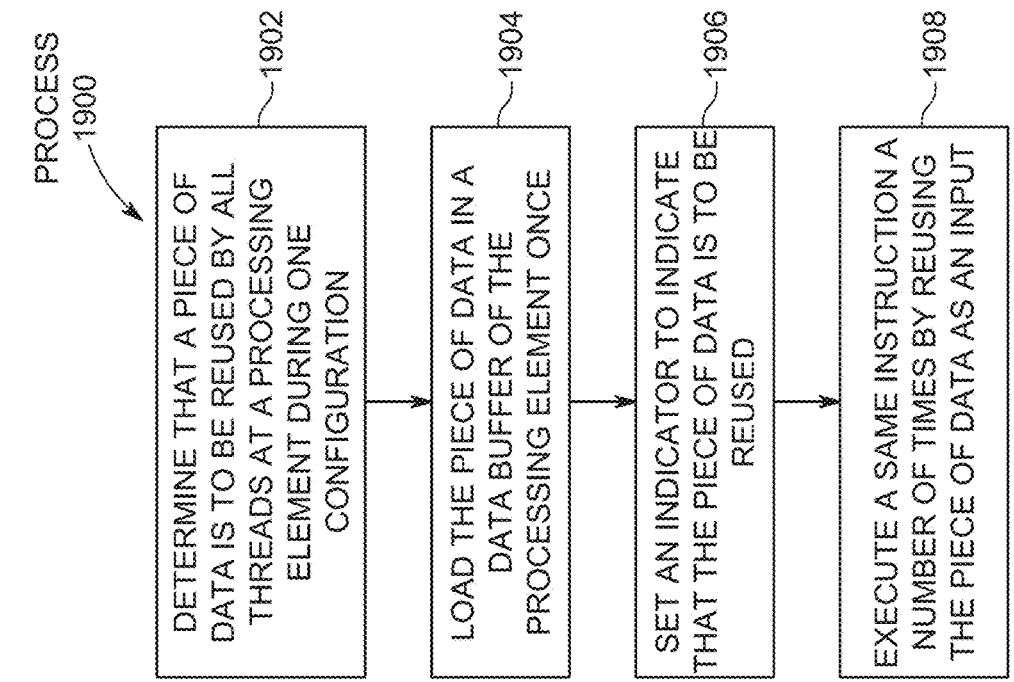
FIG. 19 is a flowchart of a method for reusing a piece of data in accordance with an embodiment of the present disclosure.

Referring to FIG. 19, a flowchart of a process 1900 for reusing a piece of data is depicted in accordance with an embodiment of the present disclosure. At block 1902, it may be determined that a piece of data is to be shared and reused by all threads at a processing element (PE) of a processor during one configuration applied at the PE. For example, in one embodiment, a shared memory access mode may be applied during one configuration for a PE. A piece of data (e.g., a constant) may be common to all threads, and may be shared and reused by all threads. At block 1904, the piece of data may be loaded once into a data buffer of the PE. In an embodiment, because the piece of data may be shared and reused, the data load operation may need to be performed only once. At block 1906, an indicator associated with the data buffer may be set to indicate that the piece of data is to be reused. In one embodiment, the data buffer inside the PE may have indicator bit "S" and this indicator "S" may be set if a piece of data in the data buffer should be reused. At block 1908, a same instruction may be executed a number of times by reusing the piece of data as an input. In one embodiment, the PE may repeatedly execute the same instruction as a pipeline stage according to a number (e.g., NUM_EXEC) specified by the configuration.

The present disclosure provides apparatus, systems and methods for reconfigurable parallel processing. For example, an embodiment of a RPP may utilize a 1-D or 2-D data path which consists of a processing element (PE) array and interconnections to process massive parallel data. The data path may be made identical in each section (e.g., one column of PE(s), MP and data routing units), which may allow the dependency graph of a kernel to be mapped to a virtual data path that may be an infinite repetition of the data path sections in one dimension.

An embodiment of a RPP may also utilize a gasket memory to temporally store data output of data paths as where the virtual data path is segmented into physical data paths. The gasket memory may function like a data buffer (e.g., FIFO) to feed data back into physical data path of the next configuration.

An embodiment of a RPP may also have a one-dimensional memory unit with memory ports (MPs) connected to each column of data path. All data accessed throughout the virtual data path may be stored in the memory unit. Each time for a new configuration, a MP may be reconfigured to access the memory unit differently while the data could stay the same. An embodiment of a RPP may separate types of memory access to private memory access and shared memory access. Private memory access may be dedicated to a particular thread with no overlapping access allowed between different threads. Shared memory access may allow all threads to access common area. Instead of defining different memories for shared and private types. An embodiment of a RPP may store data into the same memory space but provides different access methods. This eliminates unnecessary data movement from private memory to shared memory and vice versa.

Embodiments of a RPP may be optimized to allow massive parallelism for multithread processing. In one example, with one row of 32 PEs and each PE having 32 arithmetic and logic units (ALUs), 1024 ALUs may be included in one RPP core. In some embodiments, a multi-core processor may comprise multiple RPPs.

Embodiments of a RPP may be reconfigured according to a reconfiguration mechanism. The various components of a RPP that include one or more reconfiguration counters may be referred to as reconfigurable units. For example, each of the PEs (e.g., PE 218), the switching units (e.g., SB 222 and ICSB 224) and memory units (e.g., MP 220, gasket memory 216), may comprise one or more reconfiguration counters, such as the counter 606 in a PE, the counters 520 in a SB, the counters 714 in an ICSB, the counters 820 and 822 in a gasket memory, and similar counters in a MP (not shown in FIG. 4A or 4B). Data processing may be pipelined when there may be no dependency between threads. Identical instructions may be executed multiple times until all threads (e.g., four blocks of threads for one physical data path) are processed. When counters in a reconfigurable unit reach a programmed number, the reconfigurable unit may replace its configuration to a new context. This reconfiguration may be done in the same way in each PE, switch boxes and memory access units. Self-reconfiguration may be achieved with minimum idle time for switching.

The exemplary reconfiguration mechanism may reduce the power spent on configuration because the configuration is only switched once after all threads have been processed. This may also reduce idle time between configurations by switching each PE independently at its earliest time. By doing that, the memory required to store intermediated data may also be reduced.

In some embodiments, all threads may load data use the same address in a shared memory access mode. Due to the pipelined nature of operation, only the first data load instruction of all threads may need to be performed. The data loaded may be shared with all threads to reduce the memory access traffic and power consumption.

The techniques described herein may be implemented in one or more application specific integrated circuits (ASICs) in digital logic gates, or by a processor that execute instructions stored in a tangible processor readable memory storage media.

In one embodiment, any of the disclosed methods and operations may be implemented in software comprising computer-executable instructions stored on one or more computer-readable storage media. The one or more computer-readable storage media may include non-transitory computer-readable media (such as removable or non-removable magnetic disks, magnetic tapes or cassettes, solid state drives (SSDs), hybrid hard drives, CD-ROMs, CD-RWs, DVDs, or any other tangible storage medium), volatile memory components (such as DRAM or SRAM), or non-volatile memory components (such as hard drives)). The computer-executable instructions may be executed on a processor (e.g., a microcontroller, a microprocessor, a digital signal processor, etc.). Moreover, an embodiment of the present disclosure may be used as a general-purpose processor, a graphics processor, a microcontroller, a microprocessor, or a digital signal processor.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A processor, comprising:
a plurality of processing elements (PEs) each having a plurality of arithmetic logic units (ALUs) that are configured to execute a same instruction in parallel threads; and
a plurality of memory ports (MPs) chained to form a data routing bus and coupled to the plurality of PEs for the plurality of PEs to access a memory unit commonly accessible to the plurality of PEs, each of the plurality of MPs comprising an address calculation unit configured to generate respective memory addresses for each concurrent thread in one PE of the plurality of PEs to access a different memory bank in the memory unit.

2. The processor of claim 1, wherein the address calculation unit has a first input coupled to a base address input that provides a base address common to all concurrent threads in a PE, a second input coupled to a vector address that provides respective address offsets for all concurrent threads in the PE, and a third input coupled to a counter that is configured to provide thread indexes.

3. The processor of claim 2, wherein the memory unit comprises a plurality of memory caches each associated with a different memory bank and one address in the vector address is routed to one memory bank according to a thread index.

4. The processor of claim 3, wherein each of the plurality of memory ports is coupled to the plurality of memory caches and each memory bank comprises a plurality of memory words, wherein a cache miss in a memory cache causes a word to be fetched from a memory bank associated with the memory cache.

5. The processor of claim 2, further comprising a sequencer coupled to the plurality of memory ports, wherein each of the plurality of memory ports comprises a configuration buffer to receive one or more configurations from the sequencer, and the plurality of memory ports are configured to provide a same memory access pattern at a same time.

6. The processor of claim 1, wherein the memory unit is configured to store spilled variables for register spilling.

7. A method, comprising:
generating a plurality of memory addresses by an address calculation unit in a memory port (MP) of a plurality of memory ports, wherein the plurality of memory ports are chained to form a data routing bus and coupled to a plurality of processing elements (PEs) for the plurality of PEs to access a memory unit commonly accessible to the plurality of PEs, wherein each PE has a plurality of arithmetic logic units (ALUs) that are configured to execute a same instruction in parallel threads, and the plurality of memory addresses are generated for a PE of the plurality of PEs; and
accessing a plurality of memory banks in the memory unit using the plurality of memory addresses with each concurrent thread in the PE accessing a different memory bank in the memory unit.

8. The method of claim 7, wherein the address calculation unit has a first input coupled to a base address input that provides a base address common to all concurrent threads in the PE, a second input coupled to a vector address that provides respective address offsets for all concurrent threads in the PE, and a third input coupled to a counter that is configured to provide thread indexes, and the address calculation unit is configured to generate the plurality of memory addresses using the first input, the second input and the third input.

9. The method of claim 8, wherein one address in the vector address is routed to one memory bank according to a thread index.

10. The method of claim 8, wherein the memory unit comprises a plurality of memory caches each associated with a different memory bank, and accessing the plurality of memory banks in the memory unit comprises accessing the plurality of memory caches.

11. The method of claim 8, further comprising receiving one or more configurations by the memory port from a sequencer, wherein the memory port is configured to provide a memory access pattern during one configuration.

12. The method of claim 8, wherein accessing the plurality of memory banks in the memory unit is in a one column mode, in which one MP is configured to access the memory unit for all concurrent threads in one PE and the address offsets are independent for each thread.

13. The method of claim 8, wherein accessing the plurality of memory banks in the memory unit is in a linear mode, in which multiple MPs are configured to access the memory unit, wherein a first MP is configured to access the memory unit for all concurrent threads in a first PE, and a second MP is configured to access the memory unit for all concurrent threads in a second PE, wherein address offsets in the second MP are linear to address offsets in the first MP in which each of the address offsets in the second MP is equal to a corresponding address offset in the first MP plus a positive integer.

14. The method of claim 8, wherein accessing the plurality of memory banks in the memory unit is in a reverse linear mode, in which multiple MPs are configured to access the memory unit, wherein a first MP is configured to access the memory unit for all concurrent threads in a first PE, and a second MP is configured to access the memory unit for all concurrent threads in a second PE, wherein address offsets in the second MP are reverse linear to address offsets in the first MP in which each of the address offsets in the second MP is equal to a corresponding address offset in the first MP minus a positive integer.

15. The method of claim 8, wherein accessing the plurality of memory banks in the memory unit is in an overlap mode, in which multiple MPs are configured to access the memory unit, wherein a first MP is configured to access the memory unit for all concurrent threads in a first PE, and a second MP is configured to access the memory unit for all concurrent threads in a second PE, wherein address offsets in the second MP have overlap with address offsets in the first MP in which a subset of the address offsets in the second MP is equal to a subset of the address offsets in the first MP.

16. The method of claim 8, wherein accessing the plurality of memory banks in the memory unit is in a non-unity stride mode, in which multiple MPs are configured to access the memory unit, wherein a first MP is configured to access the memory unit for all concurrent threads in a first PE, and a second MP is configured to access the memory unit for all concurrent threads in a second PE, wherein each address offset in the second MP is spaced by a stride relative to a corresponding address offset in the first MP.

17. The method of claim 8, wherein accessing the plurality of memory banks in the memory unit is in a random mode, in which multiple MPs are configured to access the memory unit, and address offsets in different MPs are different random numbers such that each thread has a random access to the memory unit and different threads access different memory areas of the memory unit.

18. A method, comprising:
generating a plurality of memory addresses in an external memory unit by an address calculation unit in a memory port (MP) of a chain of memory ports (MPs) that form a data routing bus, wherein the memory port provides access to the external memory unit for a processing element (PE) having a plurality of arithmetic logic units (ALUs) configured to execute a same instruction in parallel threads; and
accessing a plurality of memory banks in the external memory unit using the plurality of memory addresses with each thread accessing a different memory bank in the external memory unit.

19. The method of claim 18, wherein the PE is one of a plurality of PEs that each has a plurality of ALUs configured to execute a same instruction in parallel threads.

20. The method of claim 19, wherein each MP of the chain of MPs has an address calculation unit configured to generate respective memory addresses for each thread in one of a plurality of PEs to access a different memory bank in the external memory unit.

* * * * *